(12) United States Patent
Reker et al.

(10) Patent No.: US 11,365,759 B2
(45) Date of Patent: Jun. 21, 2022

(54) FASTENING INSERT FOR A COMPONENT MADE OF PLASTIC, FOAM OR COMPOSITE MATERIAL

(71) Applicant: BÖLLHOFF VERBINDUNGSTECHNIK GmbH, Bielefeld (DE)

(72) Inventors: Stefan Reker, Bohmte (DE); Michael Stumpf, Bielefeld (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 298 days.

(21) Appl. No.: 16/472,534

(22) PCT Filed: Nov. 14, 2017

(86) PCT No.: PCT/EP2017/079149
§ 371 (c)(1),
(2) Date: Jun. 21, 2019

(87) PCT Pub. No.: WO2018/114145
PCT Pub. Date: Jun. 28, 2018

(65) Prior Publication Data
US 2019/0316625 A1    Oct. 17, 2019

(30) Foreign Application Priority Data
Dec. 23, 2016   (DE) .................. 102016125664.1

(51) Int. Cl.
*F16B 37/12* (2006.01)
*F16B 37/04* (2006.01)
*F16B 39/282* (2006.01)

(52) U.S. Cl.
CPC .......... *F16B 37/122* (2013.01); *F16B 37/048* (2013.01); *F16B 39/282* (2013.01); *F16B 37/12* (2013.01)

(58) Field of Classification Search
CPC ...... F16B 37/048; F16B 37/12; F16B 37/122; F16B 39/10; F16B 39/20; F16B 39/282; Y10S 411/929; Y10S 411/968
(Continued)

(56) References Cited

U.S. PATENT DOCUMENTS 2,363,663 A   11/1944   Findley
3,283,350 A   11/1966   Hattan
(Continued)

FOREIGN PATENT DOCUMENTS

CN   2711443 Y   7/2005
CN   104185741 A   12/2014
(Continued)

OTHER PUBLICATIONS

English translation of the International Preliminary Report on Patentability for PCT/EP2017/079149 dated Jun. 25, 2019, 12 pages.
(Continued)

*Primary Examiner* — Roberta S Delisle
(74) *Attorney, Agent, or Firm* — Reising Ethington P.C.; Matthew J. Schmidt

(57) ABSTRACT

A fastening insert made of plastic with a T-shaped configuration consisting of an insert disc and a hollow cylindrical shaft fastened to the insert disc. The insert disc has a plurality of passage openings arranged off-center, at least one of which has an edge projection extending circumferentially continuously or circumferentially in sections, which is formed as toothing and extends on one side or both sides beyond the respective fastening side of the insert disc. This toothing ensures an additional form-fit connection or fixation of the fastening insert in a preferably fiber-reinforced composite material.

19 Claims, 15 Drawing Sheets

Figure 1:
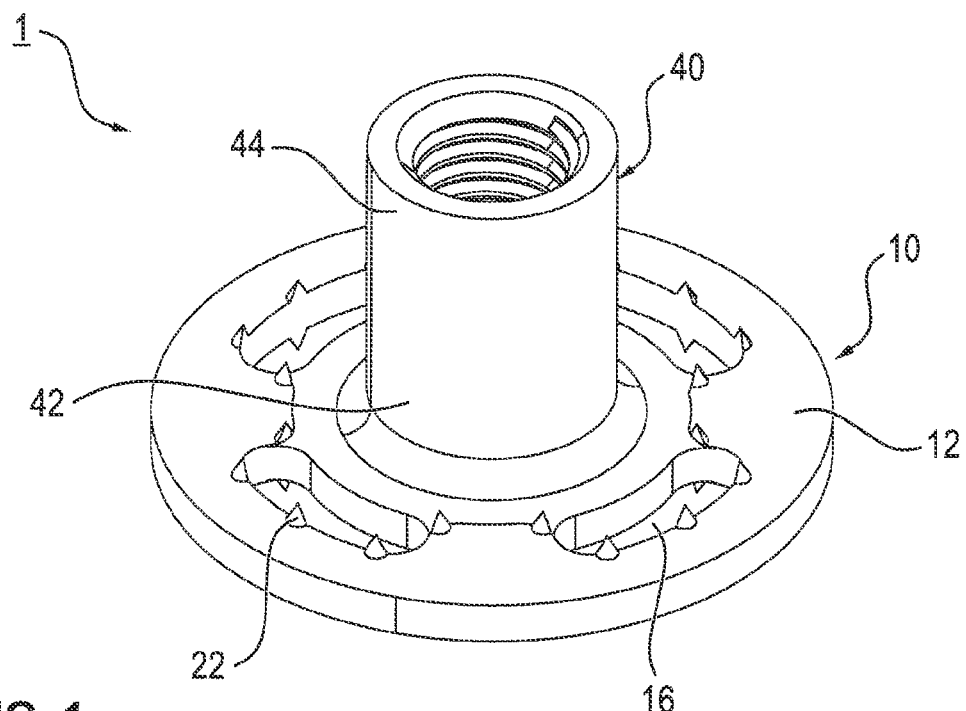

(58) Field of Classification Search
USPC .............. 411/166, 168, 172, 176, 178–179, 411/250–251, 262, 438
See application file for complete search history.

(56) References Cited

U.S. PATENT DOCUMENTS

| | | | |
|---|---|---|---|
| 3,880,041 A | 4/1975 | Markowski et al. | |
| 4,647,264 A | 3/1987 | Pamer et al. | |
| 4,842,912 A | 6/1989 | Hutter, III | |
| 5,066,180 A * | 11/1991 | Lang | F16B 37/122 411/103 |
| 5,618,144 A * | 4/1997 | Leistner | F16B 37/048 411/176 |
| 5,860,779 A * | 1/1999 | Toosky | F16B 37/122 411/432 |
| 5,863,164 A * | 1/1999 | Leistner | F16B 37/048 411/181 |
| 6,139,237 A * | 10/2000 | Nagayama | F16B 37/048 411/176 |
| 6,183,181 B1 * | 2/2001 | Leistner | F16B 33/004 411/177 |
| 6,305,888 B1 * | 10/2001 | Leistner | F16B 27/00 411/177 |
| 6,511,274 B1 * | 1/2003 | Nagayama | F16B 37/065 411/179 |
| 6,554,939 B1 | 4/2003 | Murphy | |
| 6,637,095 B2 * | 10/2003 | Stumpf | B29C 65/7814 29/513 |
| 7,419,343 B2 * | 9/2008 | Nagayama | F16B 37/048 411/176 |
| 7,815,988 B2 | 10/2010 | Stumpf et al. | |
| 8,931,991 B2 | 1/2015 | Grubert et al. | |
| 9,337,554 B2 | 5/2016 | Marcon et al. | |
| 9,676,128 B2 | 6/2017 | Grubert et al. | |
| 9,764,417 B2 | 9/2017 | Stumpf | |
| 9,855,624 B2 | 1/2018 | Stumpf | |
| 2004/0247411 A1 * | 12/2004 | Nagayama | F16B 37/048 411/204 |
| 2007/0065250 A1 * | 3/2007 | Nagayama | F16B 37/02 411/181 |
| 2007/0140810 A1 | 6/2007 | Itou et al. | |
| 2008/0251196 A1 | 10/2008 | Stumpf et al. | |
| 2012/0000062 A1 * | 1/2012 | Marxkors | B25B 27/143 29/525.02 |
| 2015/0014466 A1 | 1/2015 | Grubert et al. | |
| 2015/0328849 A1 | 11/2015 | Rosemann et al. | |

FOREIGN PATENT DOCUMENTS

| | | |
|---|---|---|
| DE | 1475024 A1 | 3/1969 |
| DE | 9115292 U1 | 2/1992 |
| DE | 4117167 A1 | 11/1992 |
| DE | 29907175 U1 | 9/2000 |
| DE | 102005013154 A1 | 10/2006 |
| DE | 102007016851 A1 | 10/2008 |
| DE | 102009048160 A1 | 4/2011 |
| DE | 102013100849 A1 | 7/2014 |
| DE | 102014202647 A1 | 8/2015 |
| DE | 102014009446 A1 | 12/2015 |
| EP | 1772635 A2 | 4/2007 |
| FR | 2222891 A5 | 10/1974 |
| FR | 3013253 A1 | 5/2015 |
| GB | 1530613 A | 11/1978 |
| GB | 2044172 A | 10/1980 |
| JP | S55122523 U | 8/1980 |
| JP | S57132810 U | 8/1982 |
| WO | WO2011152732 A1 | 12/2011 |
| WO | WO2014018848 A1 | 1/2014 |
| WO | WO2014124841 A1 | 8/2014 |
| WO | WO2016072867 A1 | 5/2016 |

OTHER PUBLICATIONS

CN Office Action for CN Application No. 201780080366.6 dated Dec. 25, 2020 (26 pages).
Written Opinion & International Search Report for PCT/EP2017/079149 dated Jun. 5, 2018, 24 pages.
CN Office Action for CN Application No. 201780080366.6 dated Mar. 21, 2022 (19 pages).

* cited by examiner

FASTENING INSERT FOR A COMPONENT MADE OF PLASTIC, FOAM OR COMPOSITE MATERIAL

1. TECHNICAL FIELD

The present disclosure relates to a fastening insert made of plastic with a T-shaped configuration, which is inserted into the material volume during the manufacturing of a component made of plastic or foam material or of a composite material and is fastened therein by curing of the material. Furthermore, the present disclosure relates to a component made of a plastic or foam material or a composite material in which such a fastening insert is arranged. In addition, the present disclosure relates to a connection of at least a first and a second component, wherein at least the first component comprises the abovementioned fastening insert. Furthermore, the present disclosure is directed towards a manufacturing method for the above-mentioned T-shaped fastening insert made of plastic as well as towards a manufacturing method for a corresponding component with this fastening insert.

2. BACKGROUND

In the prior art, components made of fiber-reinforced materials are equipped with fastening elements in order to be able to connect further components or attachment parts to them. According to a recognized procedure, the fastening elements are glued onto the component surface as it is described in U.S. Pat. No. 4,842,912. Such connections often have the disadvantage that the holding forces applying or acting only on one side of the fastening element cannot withstand the loads of the connection.

FR 3 013 253 further describes a fastening element consisting of a plate-like wire mesh. In the plate-like wire mesh, a blind rivet nut is arranged centrally in order to establish a connection with a threaded element. The plate-like wire mesh is cast into a component material during manufacturing of the component. Through the openings in the plate-like wire mesh, a through-flow of the wire mesh takes place, which ensures a respective fastening in the component. As this fastener is made of metal, unfavorable electrochemical potentials arise especially when used in combination with carbon fiber reinforced materials. These lead to electrochemical corrosion and a weakening of the connection.

GB 1 530 613 describes a fastening insert which also comprises a T-shaped configuration. The plate of the fastening insert has pins projecting on one or both sides which engage in adjacent woven fabric mats. The pins are arranged circularly around a central fastening opening and thus provide a rotation-proof arrangement of the fastening insert between the woven fabric mats. Since the plate defines a continuous face, no material-fit connection between material layers, which are adjacent and separated from each other by the plate, is possible in this face portion. This weakens not only the arrangement of the fastening insert but also the entire material composite of the component.

In addition, fastening inserts are known in the prior art, which have one or two perforated plates in their T-shaped configuration. The holes in the plates ensure a sufficient flow around the fastening insert, for example in a resin injection process (Resin Transfer Molding, RTM). At the same time, however, these fastening inserts can only be positioned inaccurately on and between woven fabric mats or material layers due to the lack of any position fixing. A further disadvantage is that a metallic fastening insert encourages electrochemical corrosion, especially in combination with carbon fiber reinforcements. Only the manufacturing of the fastening insert from stainless steel would prevent corrosion, which would, however, lead to additional material and manufacturing costs.

It is therefore the object of the present disclosure to provide a fastening insert which can be reliably anchored in the material of a component and thus provides a connection with a long lifespan. Furthermore, it is the object of the present disclosure to provide, by means of the fastening insert, a connection possibility with other connecting elements or attachment parts, which ensures a reliable and loadable or resilient connection and reduces the risk of electrochemical corrosion.

3. SUMMARY

The above object is solved by a fastening insert, by a component with this fastening insert, by a connection between a first and a second component, wherein the first component comprises the fastening insert, by a manufacturing method for the T-shaped fastening insert, by an alternative manufacturing method for the T-shaped fastening insert, by an equipment method of a fastening insert with a functional structure as well as by a manufacturing method for a component comprising a T-shaped fastening insert. Further embodiments and developments are set forth in the following description, the accompanying drawings and the claims.

The fastening insert is made of plastic and has a T-shaped configuration. In addition, the fastening insert consists of an insert disc and a shaft which is fixedly arranged on the insert disc by means of a fastening section and projects beyond the insert disc on one side or on both sides with a functional section, of which at least the insert disc can be positioned in a foam material, a plastic material or a composite material during a component manufacturing and can be fastened therein by the component manufacturing, in which the insert disc comprises: two fastening sides arranged opposite one another, each of which at least partially forms an abutment face for adjacent layers of material, a plurality of passage openings arranged off-center around the shaft, which connect the fastening sides to one another and of which at least one passage opening comprises an edge projection extending circumferentially continuously or circumferentially in sections, which is formed as toothing and extends on one side or on both sides beyond the respective fastening side of the insert disc.

The fastening insert made of plastic is specially designed for components made of foam material, plastic or for components made of a composite material. In this context, a composite material consists of two or more composite or bonded materials. As a result, the composite material has different properties than its material components. Examples of composite materials are fiber-reinforced composites. These can have long or short reinforcing fibers. A further example is layered composite materials, which are also referred to as laminates. Fiber-composite materials manufactured in layers are also frequently referred to as laminates. In the present case, composite materials may be defined as fiber-plastic composites. These include carbon fiber reinforced plastics (CFRP), glass fiber reinforced plastics (GFRP), aramid fiber reinforced plastics (AFRP) and natural fiber reinforced plastics (NFRP). Components with advantageous mechanical properties consist of CFRP. The carbon fibers used in the plastic matrix can be of different lengths and configurations.

The fastening insert of the present disclosure may be used in CFRP components. The CFRP components are manufactured from well-known fiber matrix semi-finished products. A fiber matrix semi-finished product is understood to be a semi-finished product made of a carbon reinforcing fiber impregnated with a plastic matrix. Known examples of such semi-finished products are pre-pregs. This semi-finished product consists of continuous fibers impregnated in a plastic matrix. The fibers either form a unidirectional layer or they are provided as woven fabric or laid structure. Other fiber matrix semi-finished products for CFRP components are SMC (Sheet Molding Compound) and BMC (Bulk Molding Compound). SMC are in most cases plate-shaped and are processed in a press mold. Thereby fastening inserts can be inserted into the press mold and can be processed. BMC is a formless mass which is processed as a molding compound or material using the well-known hot pressing technology. Furthermore, the BMCs can be processed with injection molding technology. At this, the reinforcing fibers are so short that they can flow through the mold during pressing or injection with the reaction resin. Furthermore, carbon fiber-containing organic sheets, which are processed by hybrid molding, are regarded as composite materials. In addition, woven fabrics, nonwoven fabrics as well as felts which are processed in a resin matrix are included. In addition, components are preferably manufactured from structural and/or integral foam with a reinforcing carbon fiber portion. Put simply, it may also be preferred to construct a component structured from several plastic layers and to arrange the fastening insert between these layers.

The fastening insert achieves its T-shaped configuration by the combination of the insert disc and the shaft. Here, the insert disc is functionally mainly responsible for the fastening of the fastening insert in the foam material, the plastic or the composite material of the component.

The shaft, in turn, with its fastening section forms a reliable mechanical coupling to the insert disc. In this way, the shaft is firmly connected to the insert disc. In addition, the shaft with its functional section provides a fastening option with the fastening insert and thus with the component in which the fastening insert is arranged.

The insert disc of the fastening insert may be distinguished by a disrupted structure. This disrupted structure may be formed by several passage openings. Since these passage openings each form a connection to the two fastening sides arranged opposite one another, an impregnating resin material or a fiber matrix semi-finished product, for example, can flow through these passage openings and harden inside them.

In order to be able to provide a mechanical position securing for the fastening insert both during the preparation of the manufacturing of a component and later in the component, at least one passage opening has a toothing projecting at least on one side. This toothing engages in the material of the later component which engages the respective fastening side of the insert disc, so that a positive or form-fit connection may be formed. The toothing projecting beyond the fastening side here is formed either completely or continuously circumferential or sectionally circumferential about the respective passage opening. Especially when the fastening insert is arranged on a woven fabric mat, a layer of reinforcing fibers, preferably carbon fibers, a plastic layer or a laminate, the toothing engaging the fibers and the adjacent material layer provides a positionally accurate retention of the fastening insert, for example in a mold for component manufacturing. At least one passage opening may have a projecting toothing on both opposite fastening sides, respectively. This is particularly advantageous if the fastening insert and in particular the insert disc are arranged between two material layers or woven fabric mats or fiber-reinforced laminates or similar material layers. This is because the toothings projecting on both sides ensure a secure retention and thus a positionally accurate arrangement of the fastening insert, for example in a mold for component manufacturing.

According to a further embodiment, the insert disc comprises at least one circumferential annular radial outer portion, in which a plurality of the passage openings is arranged uniformly or equally spaced from one another, wherein the passage openings are formed circularly and/or as a slot.

Due to its configuration, the insert disc may be divided into different functional portions. The openings arranged in an annular radial outer portion serve, among other things, to firmly arrange the fastening insert in the later foam material, plastic material or composite material. This is because these passage openings are intended to be flowed through by an impregnating resin, the plastic material or the composite material itself. In this way, it is ensured that the material layers arranged at opposite fastening sides of the insert disc are connected to each other. In addition, these passage openings in the radial outer portion serve to stitch the fastening insert such as with a woven fabric mat, a nonwoven fabric, a felt or another material layer. Thus, on the one hand, the toothing helps in the realization of a positioning as does a stitching of the fastening insert.

According to a further embodiment, the shaft of the fastening insert is configured cylindrically or hollow-cylindrically. Furthermore, a first plurality of passage openings in the outer portion are arc-shaped slots, the toothings of which extend on both sides beyond the fastening sides of the insert disc.

The two-sided toothing of the several passage openings in the outer portion supports a reliable mechanical connection of the fastening insert, in particular the insert disc, to the adjacent material portions of the composite material, the plastic material and the foam material. In addition, due to the preferred toothing in the radial outer portion, it is ensured that the fastening insert counteracts a torque load with a high resistance to unscrewing. For, by means of the toothing arranged radially on the outer side of the insert disc, a relatively large lever arm for the fastening insert is created by the insert disc, with which lever arm the fastening insert retains itself against an external torque in the component material. In addition, the toothing may be arranged in the edge portion of slots extending in an arc-shaped manner. Thus, the toothing does not only extend over a portion formed at certain points. The flow-through areas of the slots also provide a retaining web rather than a retaining point, which mechanically complements the toothing for retaining the fastening insert.

According to a further embodiment of the fastening insert, the annular radial outer portion of the insert disc is arranged in a plane and surrounds a domed-shaped central portion which is domed out of this plane in the direction of the functional section of the shaft, wherein a concave recess of the central portion defines an at least annular radial free space which is arranged radially outwardly with respect to an outer shaft face.

The configuration of the insert disc defines an additional fastening portion by means of the dome-shaped central portion. For this portion is intended to receive a certain amount of adhesive which can be used to pre-fasten the fastening insert to a layer of material during the component manufacturing. For by means of this dome-shaped central portion, it is ensured that the adhesive is only arranged in the intended concave recess of the central portion. Regardless of the fastening insert being pressed against adjacent material layers, it is preferred that the adhesive does not emerge from this concave central portion, so that passage openings in the radial outer portion are not blocked by the adhesive, either. Thus, the domed configuration of the insert disc provides an additional arrangement option for the fastening insert without compromising the later mechanical integrity of the fastening insert.

According to a further embodiment, a second plurality of passage openings in the domed central portion of the fastening insert are arranged uniformly or equally spaced from one another and are formed circularly and/or as a slot. Furthermore, the first plurality of passage openings and the second plurality of passage openings may each have a toothing projecting on one side, which are aligned opposite to one another.

It may be preferred that several passage openings are arranged both in the domed central portion as well as in the radial outer portion. Irrespective of whether these passage openings are formed circularly or arc-shaped as slots, they comprise toothing opposing one another. Thus, the toothing of the passage openings may be arranged in the domed portion projects into the dome volume. In this way, this toothing ensures that the insert disc is anchored in the hardening or curing adhesive additionally with this toothing. The toothing projecting in the outer portion ensures an anchoring of the insert disc in a material layer which is positioned above the fastening insert. Here, it is understood that the shaft of the fastening insert projects or is threaded through a suitable opening in the overlapping or superimposed material layer.

According to a further embodiment of the fastening insert, the domed central portion surrounds an inner radial annular web, which ends axially with a radial outer edge of the domed central portion and defines an annular volume within the domed central portion. The portion defined in this manner serves to receive a volume of adhesive. This adhesive may be activated or cured by irradiation with light, given that the insert disc is provided of plastic which can be irradiated or is transparent. In addition, the defined annular volume ensures that the adhesive remains trapped or enclosed in this portion without, for example, blocking passage openings in the radial outer portion of the insert disc.

According to a further embodiment of the fastening insert, the shaft is provided as a bolt or a hollow cylinder which, at one side, extends beyond the insert disc. Furthermore, the shaft may be arranged in a central or non-central non-circular opening of the insert disc with a fastening end adapted to the shape, so that an anti-rotation protection is provided between the insert disc and the shaft. Furthermore, the shaft may have radially projecting anchoring features on a radial outer side in order to be able to additionally anchor or fasten the fastening insert via the shaft in a composite material or generally in a surrounding material.

The shaft and the insert disc may be connected to each other differently depending on the embodiment of the fastening insert. One possibility is that the shaft is latched, clamped, glued, welded or molded into a central non-circular opening of the insert disc. The non-circular opening provides an additional anti-rotation protection between the shaft and the insert disc. In this way, the above-described constructive features of the insert disc for anti-rotation protection complement the fastening of the shaft in the non-circular central or non-central opening.

It may be further preferred that at least the insert disc consists of a plastic which can be irradiated by light. This serves to activate or cure an adhesive that has been applied preferably in the domed portion of the insert disc. It may be furthermore preferred that the shaft is formed as closed at one end face adjacent to the insert disc and/or the insert disc of the fastening insert is formed as closed in a central portion adjacent to the shaft. This specific construction ensures that a metallic functional structure in the functional section of the shaft, for example, does not come into contact with reinforcing fibers of the composite material. Therefore, these constructive alternatives ensure that composite material cannot penetrate the inside of the shaft from the fastening side of the shaft during component manufacturing. This specific arrangement especially prevents electrochemical corrosion, which occurs, for example, when metal comes into contact with a reinforcing carbon fiber.

The present disclosure further comprises a fastening insert made of plastic with a T-shaped configuration consisting of an insert disc and a shaft, which is fixedly arranged on the insert disc by means of a fastening section and projects beyond said insert disc on one side or on both sides with a functional section, of which at least the insert disc can be positioned in a foam material or a composite material during a component manufacturing and can be fastened therein by the component manufacturing, in which the insert disc may comprise two fastening sides arranged opposite one another, which each form at least partially an abutment face and in which the shaft comprises a hollow cylindrical shape with a radial outer side as well as a radial inner side and is connected via the radial outer side to the insert disc and a metallic functional structure is non-positively or frictionally anchored to the radial inner side of the hollow cylindrical shaft or is positively or form-fittingly molded into the radial inner side of the hollow cylindrical shaft, so that a direct outward contact of the metallic functional structure with the composite material, the plastic material or the foam material is prevented at least adjacent to the insert disc by the shaft surrounding the functional structure and/or the insert disc.

The fastening insert may be characterized by providing a reliable retention in a manufactured component and a functionally effective arrangement of a metallic functional structure within the shaft of the fastening insert. Especially, the inner volume of the hollow cylindrical shape of the shaft provides sufficient space for such a metallic functional structure. Such metallic functional structures include wire thread inserts, metallic thread inserts, metallic connecting inserts and the like, which are molded into the plastic of the shaft or are non-positively or frictionally connected to it. In addition to these constructional properties, the fastening insert at the same time also ensures that the metallic functional structure cannot come into contact with the composite material, the plastic material or the foam material via the fastening end of the shaft. For this purpose, preferably either the insert disc is formed closed or the fastening end of the shaft comprises no opening in the direction of the insert disc. It is also possible that, although the shaft is formed open towards the insert disc, the composite material, the plastic material or the foam material cannot penetrate into the hollow cylindrical interior of the shaft during the component manufacturing. As a result, any reinforcing fibers, such as carbon fibers, which may be present in the foam material or composite material do not come into contact with the metallic functional structure. In this way, electrochemical corrosion is effectively prevented, which could endanger not only the functionality of the fastening insert but also its integrity.

As already mentioned above, according to a further embodiment of the fastening insert, the shaft is formed closed at an end face adjacent to the insert disc and/or the insert disc of the fastening insert is formed closed in a central portion adjacent to the shaft. According to a further embodiment of the fastening insert, the shaft comprises an inner thread on the radial inner side, in which a wire thread insert is arranged.

According to a further embodiment, the metallic functional structure consists of a wire thread insert. This wire thread insert reinforces an inner thread present on the hollow cylindrical inner side in the shaft made of plastic. This wire thread insert is only screwed so far into the depth of the shaft, i.e. in the direction of the insert disc into the shaft, so that it does not project out of the shaft at the fastening end thereof. In any case, this avoids the risk of possible electrochemical corrosion by contact with the foam material, the plastic material or the composite material. In combination with the wire thread insert, it may also be preferred to arrange the wire thread insert projecting axially beyond the functional section of the shaft. In this way, constructions of a wire thread insert can be combined with the shaft, which, for example, comprises a winding with a tapered diameter. If a screw is screwed into such a tapered winding, the latter can expand outwards and at the same time clamps the screwed-in screw in the wire thread insert. Such an arrangement would not be possible if the tapered winding of the wire thread insert would be formed within the hollow cylindrical shaft.

According to a further embodiment of the fastening insert, the inner thread comprises thread recesses located on the radial outer side, which comprise a continuous or sectionally circumferential free area or clearance in order to blunt the thread recess at least in certain portions.

The wire thread insert inserted in the inner thread of the hollow cylindrical shaft serves to reinforce and thus secure the continuance of the inner thread. At the same time, mechanical stresses are transferred to the material of the shaft via this wire thread insert, while, for example, a screw is screwed into the wire thread insert. In order to be able to transfer these mechanical stresses less material-intensively to the hollow cylinder shaft, radially outer thread recesses are selectively blunted. This results in the reduction of mechanical stress peaks that would otherwise occur at tapered radially outer thread recesses. In this way, a selectively arranged blunting of the otherwise tapered thread recess increases the lifespan of the inner thread of the hollow cylindrical shaft of the fastening insert.

According to a further embodiment of the fastening insert, the wire thread insert ends at a distance from an open or closed axial end of the shaft at the fastening section within the shaft. According to a further embodiment mentioned above, the wire thread insert extends beyond an axial exit of the shaft in the functional section and also comprises a winding tapered in diameter compared to other windings of the wire thread insert.

According to a further embodiment of the fastening insert, a metallic thread insert or a metallic connecting insert is glued to the radial inner side of the shaft and/or is non-positively or force-fittingly connected to the radial inner side of the shaft, preferably by clamping.

The use of metallic thread inserts or metallic connecting inserts in plastic parts is generally known. These are arranged, for example, in bores in plastic housings provided for this purpose. In addition to the adhesive connection between the plastic housing and the thread insert or connecting insert, especially the rigid construction of the plastic housing or plastic part provides the necessary mechanical support, stability and the mechanically loadable installation point for the thread insert or connecting insert. In comparison to these solutions, it became apparent that the combination of an insert disc and a shaft connected thereto constitutes an effective retaining construction. With this construction combined with embedding the fastening insert in a component material, the required stability of the shaft is provided to sufficiently retain a thread insert or connecting insert for a reliable connection. Since the shaft is anchored with reliable stability in a component, which is made of composite material for example, a reliable connection is achieved with a glued-in thread insert or connecting insert in the same way as with a wound wire thread insert molded into the shaft. For, according to a further embodiment of the fastening insert, a metallic thread insert or a metallic connecting insert or a wound wire thread insert is molded into the radial inner side of the shaft, so that these are at least positively retained in the shaft.

The molding-in of the thread insert or of the metallic connecting insert or of the wire thread insert can be carried out in different ways. One possibility is to heat the respective insert by means of a heat supply so that it transfers its amount of heat to the inner side of the shaft, softens it thereby and thus molds the insert into the inner side. According to a further embodiment, it is possible to equip the thread insert or connecting insert with a self-cutting or self-tapping outer thread. With this thread the insert is then screwed into the hollow cylindrical inside of the shaft. This allows the insert to cut itself a retaining thread in the inner side of the shaft.

Furthermore, it may be preferred to mold the wound wire thread insert into the inner side of the shaft already during the manufacturing process of the shaft. In general, it should be noted that a metallic thread insert dictates an inner thread, while its radial outer side serves to fasten the thread insert in the shaft. A metallic connecting insert provides any other fastening structure instead of an inner thread. This could be, for example, a latching connection or a bayonet connection. A wound wire thread insert that can be formed on the inner side of the shaft may be a block-wound wire thread insert. This ensures that no liquid plastic can penetrate into the inside of the wire thread insert, even during the manufacturing of the shaft with the wire thread insert arranged inside the shaft. In this context, it may also be preferred to close the wire thread insert by means of a plug. In this way it is ensured that the inner thread of the molded-in wire thread insert is not blocked by plastic residues even after the manufacturing of the fastening insert.

According to the disclosure, it also may be preferred that the thread insert or the connecting insert ends at a distance from an axial exit of the shaft at the fastening section inside the shaft. It also may be preferred that the thread insert includes a wire thread insert for thread reinforcement in its inside.

The present disclosure also includes a component consisting of a foam material, a plastic material or a composite material, in which a fastening insert according to one of the above-described embodiments is fixedly arranged within said material alternatives. Accordingly, the fastening insert in its various preferred embodiments is embedded in a laminate component, in a layered component or in a composite component, wherein these components may have at least one textile layer or a fiber reinforcement layer. Thus, the component may consist of structural or integral foams with a carbon fiber reinforcement or of woven, nonwoven or felt layers reinforced with resin. According to a further embodiment, the fastening insert is embedded in fiber matrix semi-finished products, such as BMC and SMC (see above), which may be carbon-fiber-containing molding compounds. According to a further embodiment, the fastening insert is embedded in carbon-fiber-containing organic sheets by means of hybrid molding.

Furthermore, the present disclosure comprises a connection of at least a first and a second component, of which at least the first component corresponds to the component described in the previous paragraph with an embedded fastening insert. Within the context of this connection, at least one first and the one second component are connected to one another by means of a fastening means and the fastening insert in the first component.

The present disclosure further includes a manufacturing method for a T-shaped fastening insert, in particular for a fastening insert according to one of the above-described embodiments. This manufacturing method comprises the following steps: providing an injection mold, the mold cavity of which dictates the structural features of the fastening insert in complementary form, filling the mold cavity with at least one flowing plastic, curing the plastic enclosed in the mold cavity and demolding the fastening insert from the injection mold.

In general, the fastening insert is manufactured according to its embodiments by means of an injection molding method. This injection molding method provides sufficient variety to realize the various geometric features, strength requirements, configuration designs with respect to the functional section of the shaft, as well as the necessary constructive features for fastening. It has been proved to be particularly advantageous to use a one-component injection molding method with only one plastic to fill the injection mold. In the same way, a two-component injection molding method, in which two different plastics are used in the manufacturing process, is also advantageous, especially for higher mechanical demands on the fastening insert to be manufactured. For this two-component injection molding method makes it possible, for example, to use two plastics with different chemical compositions or two plastics with a different proportion of reinforcing fibers for the manufacturing of the shaft and the insert disc. Of course, other combinations of material configurations are also possible here (see below).

According to a further embodiment of the manufacturing method, the mold cavity is filled with only one plastic, so that the fastening insert is manufactured using a one-component injection molding method, or the mold cavity is filled with a first plastic in the portion of the insert disc to be molded and with a second plastic in the portion of the shaft, so that the fastening insert is manufactured using a two-component injection molding method.

The preferred one-component injection molding method provides a fastening insert that is identical in material with respect to the insert disc and the shaft of the fastening insert. Already with regard to the choice of material and the steps to be carried out, this method is associated with less effort compared to, for example, a two-component injection molding method. The two-component injection molding method may open up the possibility of processing accordingly selected plastics with the two-component injection molding method with regard to the constructive requirements and the functional requirements of the shaft and the insert disc. Since it is preferably the insert disc that transfers high retention forces of the fastening insert into the component material, a plastic of high mechanical stability is recommended here. Therefore, a plastic with a high proportion of reinforcing fibers may be injected into the injection mold for the insert disc. With regard to the plastic used to form the shaft, it may be preferred to use a plastic that is easy to shape after curing. Because this plastic opens up the possibility of combining the shaft of the fastening insert with various thread inserts and connecting inserts or of molding these into the radial inner wall of the shaft.

According to a further embodiment, which is specifically based on the two-component injection molding method, the first and second plastics are identical and differ in a proportion of reinforcing fibers. Alternatively, the first and second plastics are different in a chemical composition or the first and second plastics are different in a chemical composition and comprise different proportions or amounts of reinforcing fibers. With this preferred material design, which refers to the characteristics of the components of the fastening insert to be met, the constructive features of the fastening insert as described above are optimally supported by the choice of material.

According to a further embodiment, at least the insert disc is transparent or at least light-permeable or can be irradiated by light after manufacturing using the first plastic.

It has often proved to be difficult to arrange the fastening insert positionally accurate in the component form during the component manufacturing and to fix or retain it there. This is because even the arrangement of a further layer of material on top of the fastening insert can cause it to change its previously adjusted position. In this context, it has proved advantageous to pre-fix the fastening insert using a light-activated or curable adhesive during the component manufacturing. For this purpose, such an adhesive may be applied to the bottom side of the insert disc, preferably in the domed portion of the insert disc, and the insert disc is subsequently arranged on the existing layer of material, plastic or woven fabric. This adhesive is activated and/or even cured with the help of the specific irradiation of light, so that the fastening insert is pre-fixed. This adhesive connection does not replace the later retention of the fastening insert to be realized by the component material in the component compound. Rather, it creates a temporary fixation so that the further designs of the material layers which overlay the fastening insert cannot endanger its positioning.

According to a further embodiment, the injection mold defines an insert disc having two opposite fastening sides with a plurality of passage openings arranged off-center about the shaft, which connect said fastening sides to one another and of which at least one passage opening has an edge projection extending circumferentially continuously or circumferentially in sections, which is formed as toothing and extends beyond the respective fastening side of the insert disc on one or both sides. With regard to the designs of the insert as described above for the reliable arrangement of the fastening insert in the component, it is preferred that the injection mold dictates precisely the constructive features of the insert disc by its complementary form design. Accordingly, the advantages of the correspondingly shaped insert disc as described above result from this complementary form design.

Alternatively or in addition to the design of the injection mold for the special forming of the insert disc, it is further preferred according to the invention that the injection mold contains a core which defines a radial inner wall of a shaft of the fastening insert, so that a thread is formed on the radial inner wall. This design of the injection mold refers to the construction of the shaft. This is because during the injection molding process, the shaft is adapted to reliably receive a wire thread insert or differently shaped thread inserts in its inside.

According to a further embodiment for the design of the shaft, a wire thread insert is installed in the thread of the radial inner wall of the shaft after the demolding of the fastening insert. Such an installation uses a known installation tool for wire thread inserts. The installation tool will grip the wire thread insert at its installation tang or a similar installation end and screw it into the inner thread of the shaft.

It further may be preferred that the manufacturing method comprises the further step: positioning a wire thread insert or a thread insert or a connecting insert in the mold cavity and molding in the wire thread insert, the thread insert or the connecting insert when filling the mold cavity with liquid plastic. According to this preferred method alternative for the manufacturing of the fastening insert, the functional section of the shaft is already further designed during the manufacturing method. This prevents the need for an additional special installation step for a metallic functional structure to follow the manufacturing of the fastening insert. This is because, according to the designs of the manufacturing method, it is possible in an effective manner to place known thread inserts or connecting inserts or block-wound wire thread inserts within the injection mold in such a manner that, once the manufactured fastening insert has been molded, they appropriately configure the function of the inner wall of the shaft.

According to a further embodiment of the manufacturing method of the fastening insert, this comprises the further step of: installing a thread insert or a connecting insert by means of a thermal or mechanical method in the shaft of the fastening insert after the fastening insert has been demolded. In accordance with this preferred embodiment of the manufacturing method, initially the fastening insert is manufactured by injection molding. After it has been demolded from the injection mold, an installation step for the thread insert, the connecting insert or another metallic functional element follows. In this context, for example, the plastic of the shaft is thermally softened in order to be able to form a thread insert or a connecting insert inside the shaft. This heating may be possible by friction welding, ultrasonic welding or by irradiation with a heat source. Alternatively, it also may be preferred to provide the thread insert or the connecting insert with a self-cutting or self-tapping outer thread so that it can be screwed into the shaft of the fastening insert. Based on this approach, the thread insert or connecting insert is retained within the shaft non-positively or frictionally and positively or in a form-fit manner. It also may be preferred that the metallic functional structure is constructed flexibly or springy so that it can be inserted into the shaft in a compressed state. After this insertion is completed, the functional structure is unloaded so that it expands within the inside of the shaft. As a result of this expansion, the metallic functional structure becomes stuck and/or is at least non-positively or frictionally anchored in the hollow cylindrical interior of the shaft.

The present disclosure includes a further manufacturing method for a T-shaped fastening insert, in particular for one of the above-described embodiments of the fastening insert. This manufacturing method comprises the following steps: providing an insert disc of the fastening insert made of plastic, may be of transparent plastic or plastic which can be irradiated by light, which has two fastening sides arranged opposite one another with a plurality of passage openings arranged off-center about the shaft, which passage openings connect the fastening sides to one another and of which at least one passage opening comprises an edge projection extending circumferentially continuously or circumferentially in sections, which is formed as toothing and extends on one or both sides beyond the respective fastening side of the insert disc, providing a shaft of the fastening insert and connecting the insert disc and the shaft captively to form a T-shaped fastening insert.

This alternative manufacturing method for the T-shaped fastening insert is based upon the premise that initially the insert disc and the shaft of the fastening insert are manufactured separately. In a subsequent step, the two basic components of the fastening insert are connected to one another. This approach opens up the possibility of initially being able to optimally adapt the individual components of the fastening insert to the respective requirements in the later installation state in the component. Accordingly, a mechanically stable plastic with fiber reinforcement is used to manufacture the insert disc. Since the shaft does not have to consist of the same plastic, it is not necessary after this manufacturing route to adapt a complex two-component injection molding method to the manufacturing of the fastening insert. This is because the shaft is made of a different plastic parallel to the insert disc, which meets the functional requirements. Subsequently, the insert disc and the shaft are connected to one another in such a manner that they constitute a reliable structural unit.

In the form of the manufacturing method described above, the insert disc and the shaft are connected by: mechanically clamping or latching the shaft in a central or decentral opening of the insert disc, or thermally connecting the shaft and the insert disc, preferably by ultrasonic welding or friction welding, or adhering the shaft and the insert disc. These various connection possibilities for the shaft and the insert disc ensure a reliable connection between the insert disc and the shaft. At the same time, they also make it possible to freely choose the plastics or, more generally, the materials used to manufacture the insert disc and the shaft, especially when the shaft is mechanically clamped and latched in a central or decentral opening of the insert disc. In this way, the fastening insert can be adapted to any component configuration. According to a further embodiment of the present manufacturing method, the insert disc comprises two oppositely arranged fastening sides with several passage openings arranged off-center about the shaft, which connect the fastening sides with one another and of which at least one passage opening has an edge projection extending circumferentially continuously or circumferentially in sections, which is formed as toothing and extends on one side or on both sides beyond the respective fastening side of the insert disc.

According to a further embodiment of the manufacturing method described above, a radial inner wall of the shaft of the fastening insert is provided with a thread and a wire thread insert is installed in the thread of the radial inner wall of the shaft. It has already been described above that a thread located on the inner radial wall of the shaft can be reinforced by means of a wire thread insert. This design of the shaft is possible in the same way after the manufacturing of the fastening insert in the injection molding method as with a separate manufacturing of the insert disc and the shaft and the subsequent assembly of these two structural components. Thus, the shaft may be manufactured with an inner thread and the wire thread insert is subsequently installed in this inner thread to reinforce it. Subsequently, the insert disc and the shaft are connected according to the manufacturing routes described above.

As an alternative to the installation of the wire thread insert, it also may be preferred in the present manufacturing method to install a thread insert or a connecting insert by means of a thermal or mechanical method or an adhesive method in the shaft before or after the insert disc has been connected to the shaft.

The present disclosure further includes a method of equipping a T-shaped fastening insert, preferably a T-shaped fastening insert according to the preferred constructive designs described above. This equipment method comprises the following steps: providing a single T-shaped fastening insert or a component with a T-shaped fastening insert attached thereto and installing a wire thread insert in a thread on a radial inner wall of a shaft of the T-shaped fastening insert or installing a thread insert or a connecting insert by means of a thermal or mechanical method or an adhesive method in a shaft of the T-shaped fastening insert.

By this equipment method it is underlined that the fastening insert can already be equipped with its metallic functional structure during its manufacturing or in a subsequent equipment method. Accordingly, it may be preferred to equip the single fastening insert or a fastening insert already embedded in a component with a wire thread insert, a thread insert or a connecting insert. These steps are performed in the same way as they have already been described above. The equipment method offers the flexibility of being able to equip the shaft at the manufacturer of the fastening insert or at the component manufacturer or even at the component customer.

The present disclosure further includes a manufacturing method for a component made of a composite material, of plastic or of another foam material, with a T-shaped fastening insert comprising an insert disc and a shaft fastened thereto, preferably a fastening insert according to the above-described embodiments. The manufacturing method for the component comprises the following steps: providing a component mold with at least one first material layer, may be a fiber layer or plastic layer or a woven fabric layer, wherein the component mold defines a complementary shape of a component to be manufactured, positioning and pre-fixing the fastening insert on the at least one first material layer, wherein the pre-fixing is achieved by establishing a material-bonded and/or positive or form-fit connection between a first fastening side of the insert disc facing the first material layer and the first material layer, after step II embedding the connection of the fastening insert and the first material layer in a plastic, a fiber-reinforced plastic, a resin or in a foam material with or without fiber reinforcement.

The fastening insert may be embedded in components of various types of material. The constructive features of the insert disc are particularly helpful in ensuring a reliable positioning of the fastening insert during the manufacturing. The toothing and the further designs of the insert disc are suitable for retaining or fixing the fastening insert on a first material layer. This first material layer consists of a fiber layer of carbon fibers or glass fibers, a woven layer of such fibers, a nonwoven, a felt or a pre-processed molding compound with reinforcing fibers, according to various embodiments. Furthermore, it may be preferred to arrange the fastening insert on a first layer of a plastic or a structural or integral foam with a fiber reinforcement, such as a carbon fiber reinforcement. Because even on this structured material layer, the constructive design of the insert disc supports a reliable positioning of the fastening insert. After the fastening insert has been arranged at the desired position, the remaining cavity of the component mold is filled with the desired component material and the component is subsequently demolded.

According to a further embodiment of the manufacturing method, the latter comprises the further step: arranging at least a second material layer, a second fiber layer or plastic layer or a woven fabric layer, on a second fastening side of the insert disc facing the second material layer in such a manner that the second material layer surrounds the shaft of the fastening insert.

The component may comprise at least two material layers, which, according to an embodiment, are composed of reinforced fibers. Such fibers are, for example, carbon fibers or glass fibers, wherein other reinforcing materials can also be inserted into the component form. Since the insert disc of the fastening insert also has a projecting toothing on the second fastening side in accordance with the embodiments described above, this toothing also provides an additional grip or hold in the second fiber layer or material layer. Thus, the fastening insert is at least mechanically pre-fixed between two adjacent fiber layers or material layers so that it is arranged positionally accurate during the manufacturing method of the component.

According to a further embodiment of the manufacturing method, an impregnation of the stack of the first and the second material layer with the intermediate fastening insert with a liquid resin material as well as a curing of the material to a component of a multi-layer composite material is performed.

Further, the manufacturing method is distinguished by the pre-fixing being achieved by a positive or form-fit connection by means of a toothing on the first fastening side of the insert disc, which engages at least in the first material layer and hooks into it. According to an alternative or additional embodiment of the present manufacturing method, the pre-fixing is performed by a material-bonded connection by means of a connecting adhesive between the first fastening side of the insert disc and the first material layer, which is cured by means of light and/or heat.

As already described above, the toothing of the insert disc ensures a safe positioning and fixing of this position on and between the material layers of the component to be manufactured. For this, the toothing engages in the respective adjacent material layer. This applies both to a material layer arranged on only one fastening side and to two material layers arranged on the two opposite fastening sides of the insert disc. In order to support this form-fit fixing or positioning aid, it also may be preferred to pre-fix the fastening insert by means of an adhesive. In this context, the use of light-curing adhesives has proved to be particularly helpful.

According to a further embodiment, an adhesive is applied in a concave recess of the first fastening side of the fastening insert and the adhesive is cured by light irradiation after the positioning on the first material layer by irradiating the insert disc consisting of a transparent material or a material which can be irradiated by light. Since the pre-fixing adhesive spot may be limited to the portion of the concave recess, the adhesive spot optimally complements the mechanical pre-fixing of the insert disc. In addition, the adhesive spot does not negatively influence the embedding of the fastening insert in the component material. This is because the adhesive spot preferably does not block the openings in the radial outer portion of the insert disc, so that these can be flowed through by an impregnating resin material, for example.

According to a further embodiment of the present manufacturing method, in a further step, a fixing of the second fastening side of the insert disc takes place at least by means of a positive or form-fit connection at the second material layer by that a toothing at the second fastening side of the insert disc engages at least in the second material layer. In addition, as an alternative to or in addition to the mechanical pre-fixing described above, it is preferred to stitch the fastening insert onto at least the first material layer.

According to a further embodiment of the present manufacturing method, the component is manufactured in an RTM (Resin Transfer Molding) process or by cold pressing or hot pressing.

4. BRIEF DESCRIPTION OF THE ACCOMPANYING DRAWINGS

Figure 2:
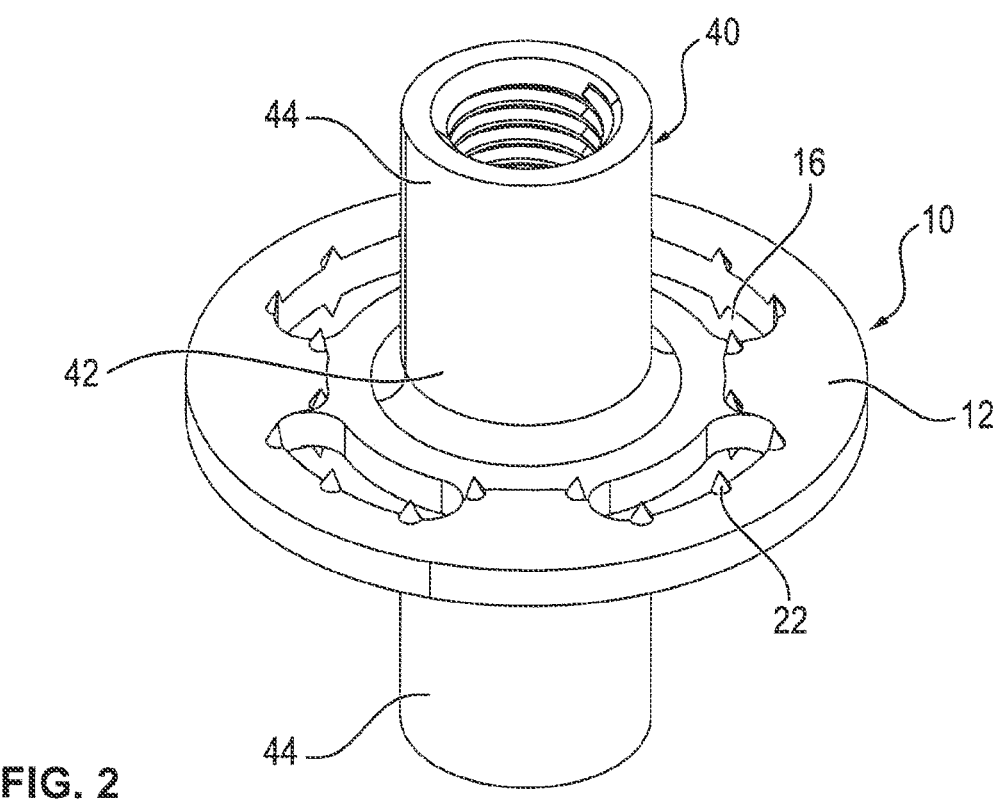
Figure 3B:
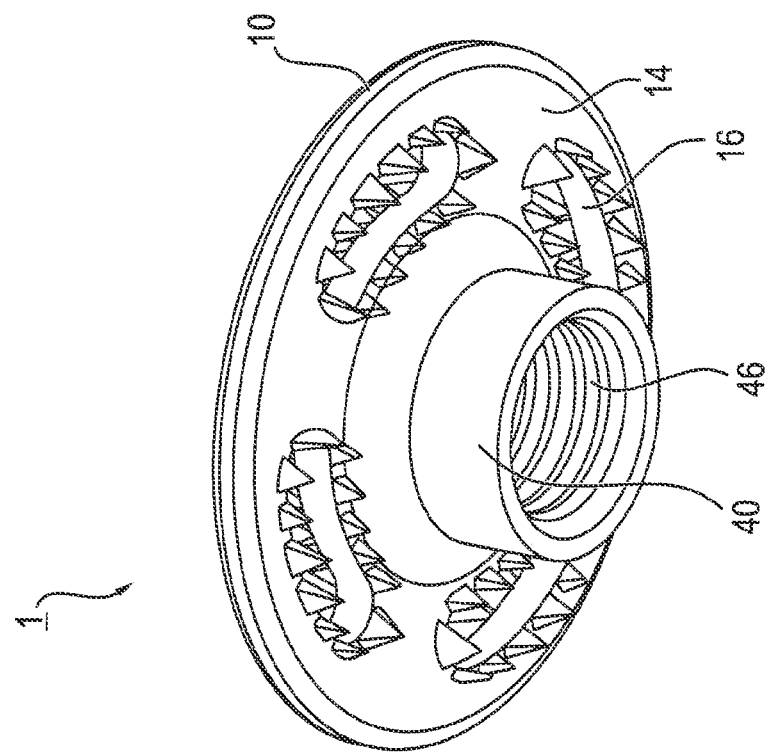
Figure 3A:
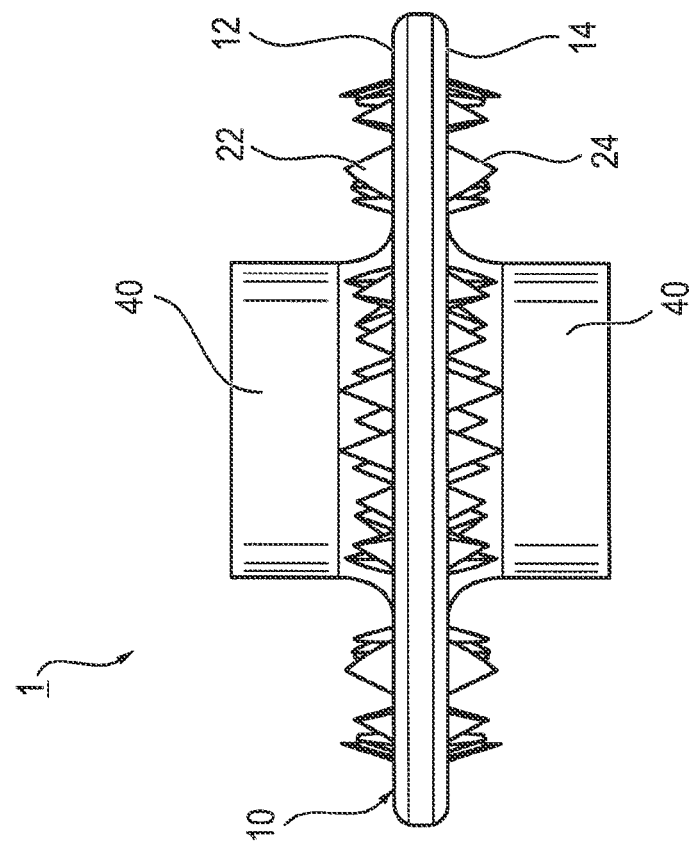
Figure 4:
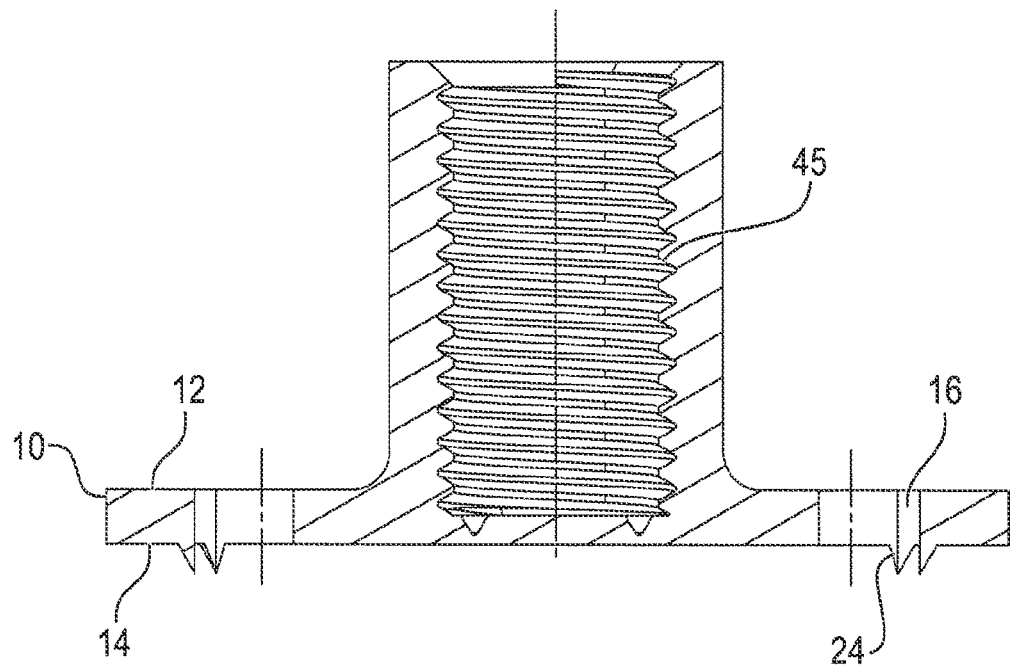
Figure 5:
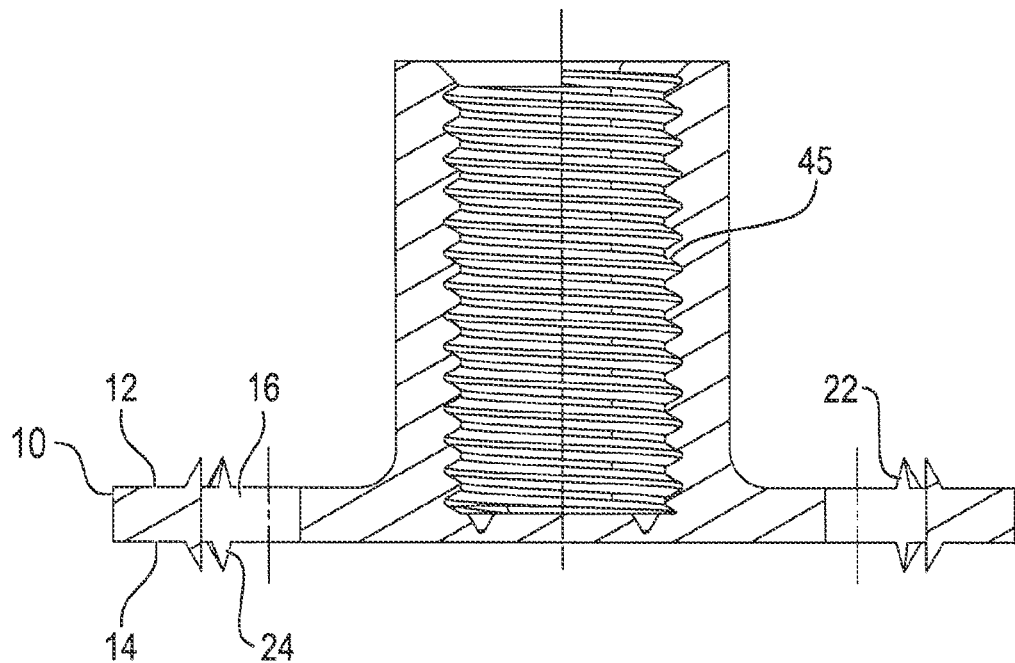
Figure 6:
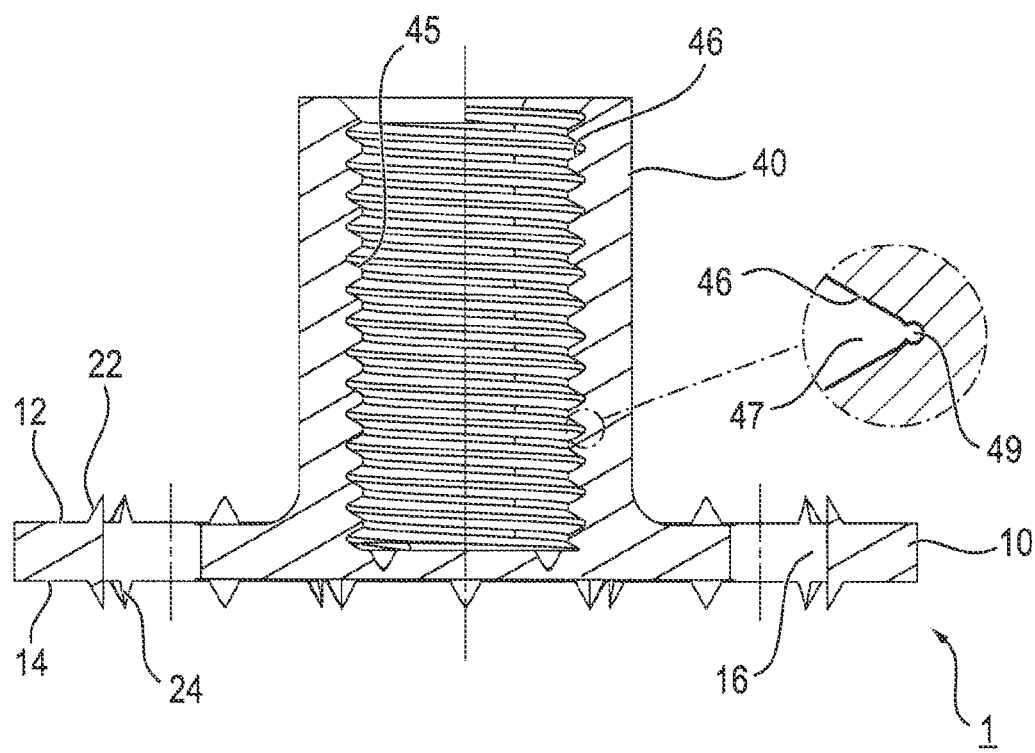
Figure 7:
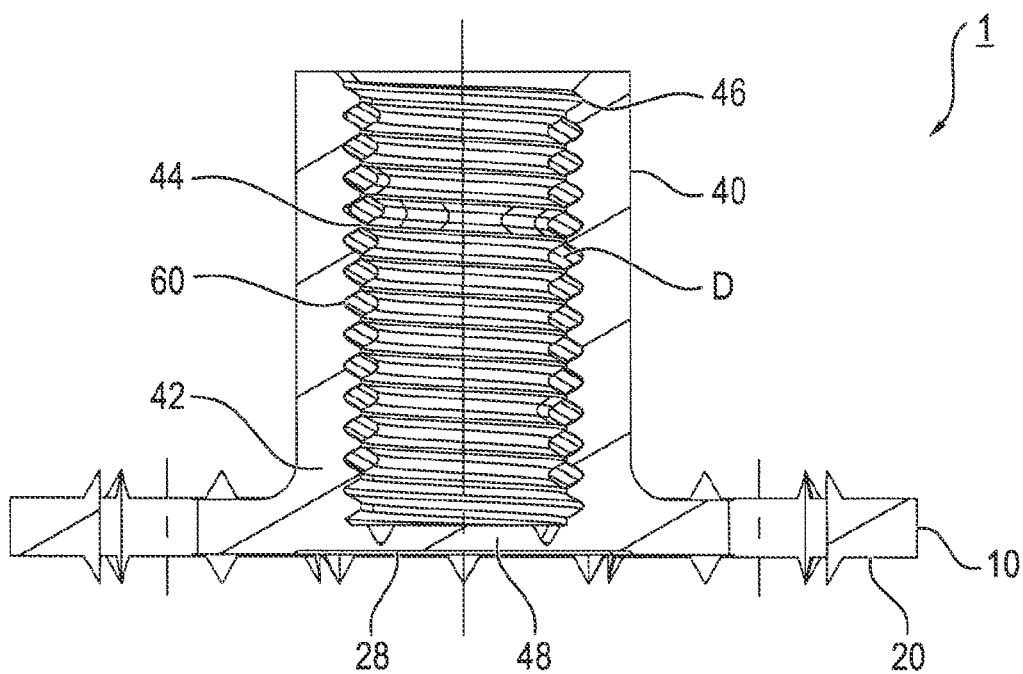
Figure 8:
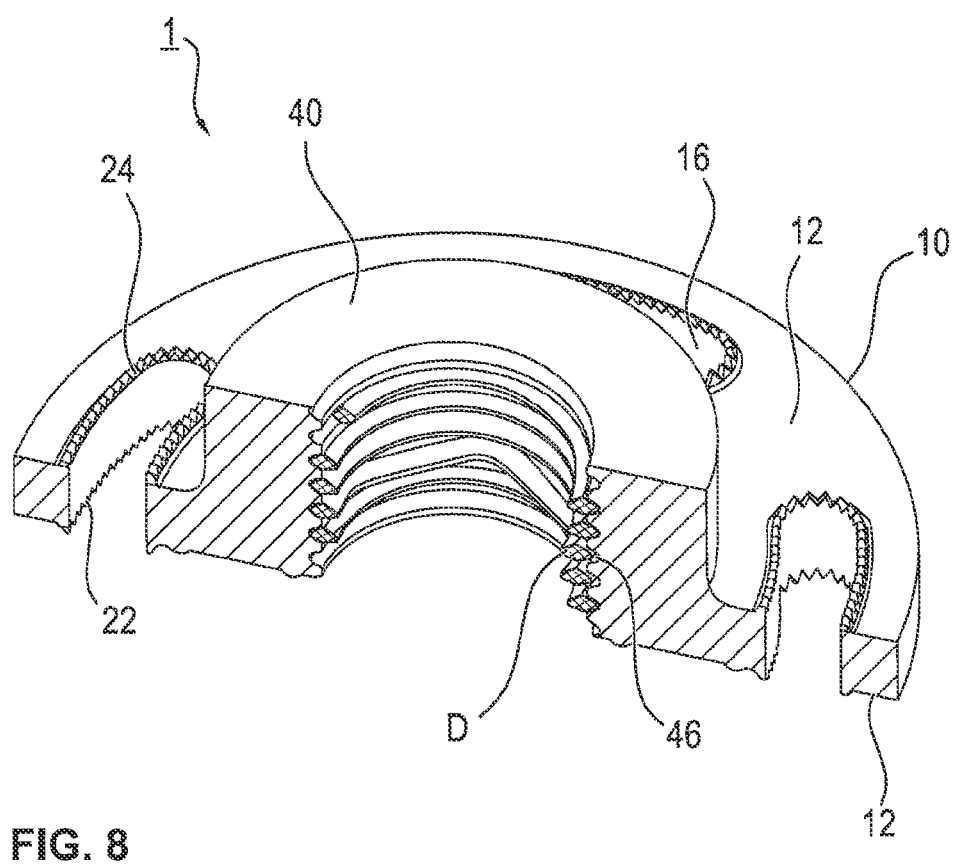
Figure 9:
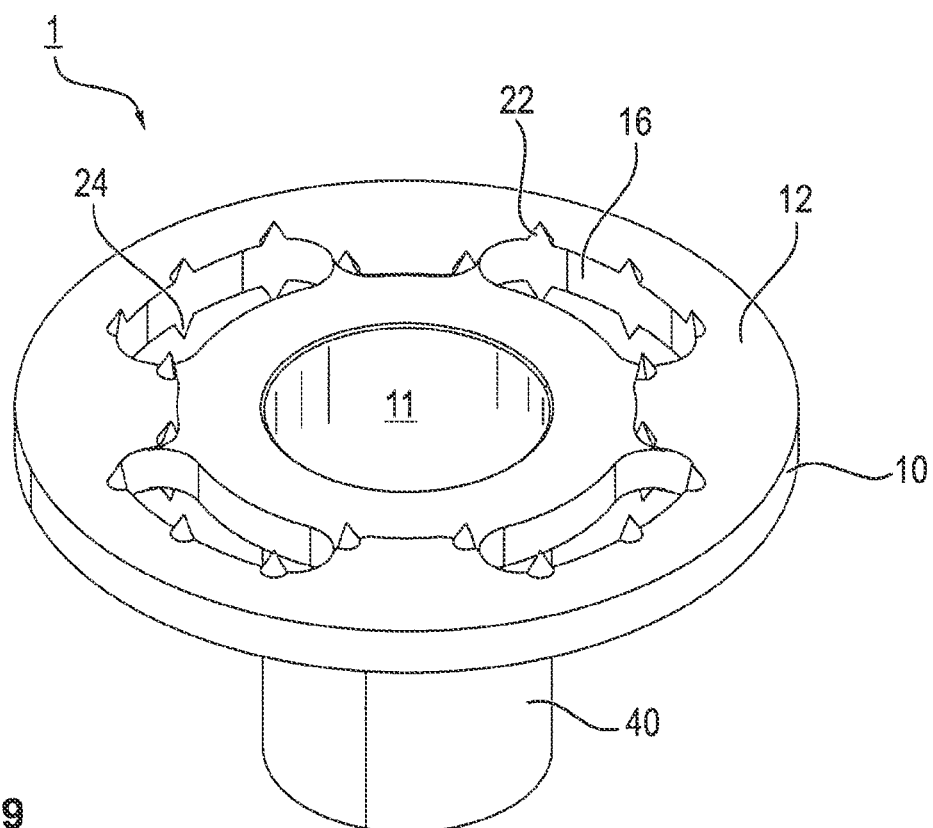
Figure 10:
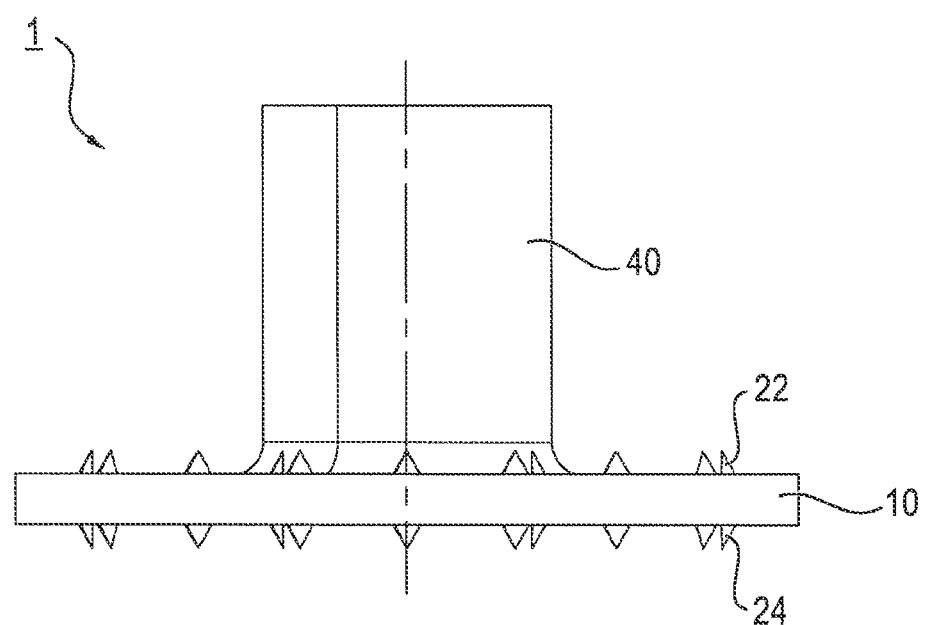
Figure 11:
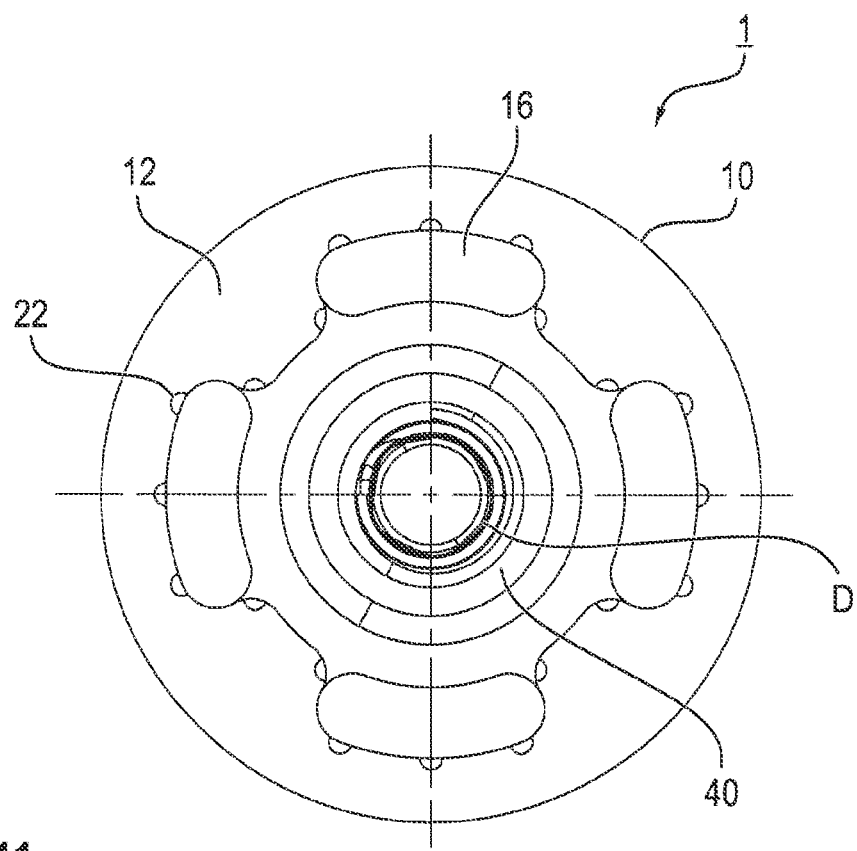
Figure 12:
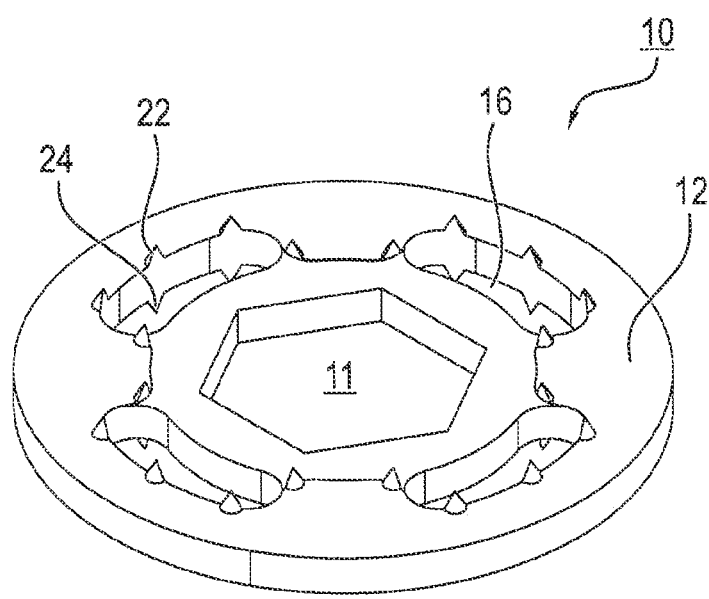
Figure 13:
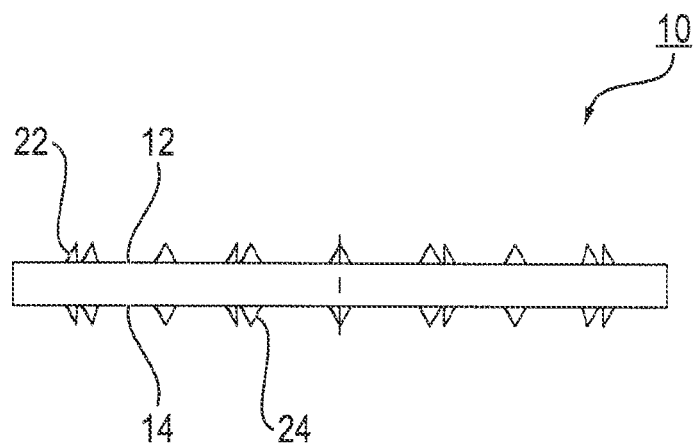
Figure 14:
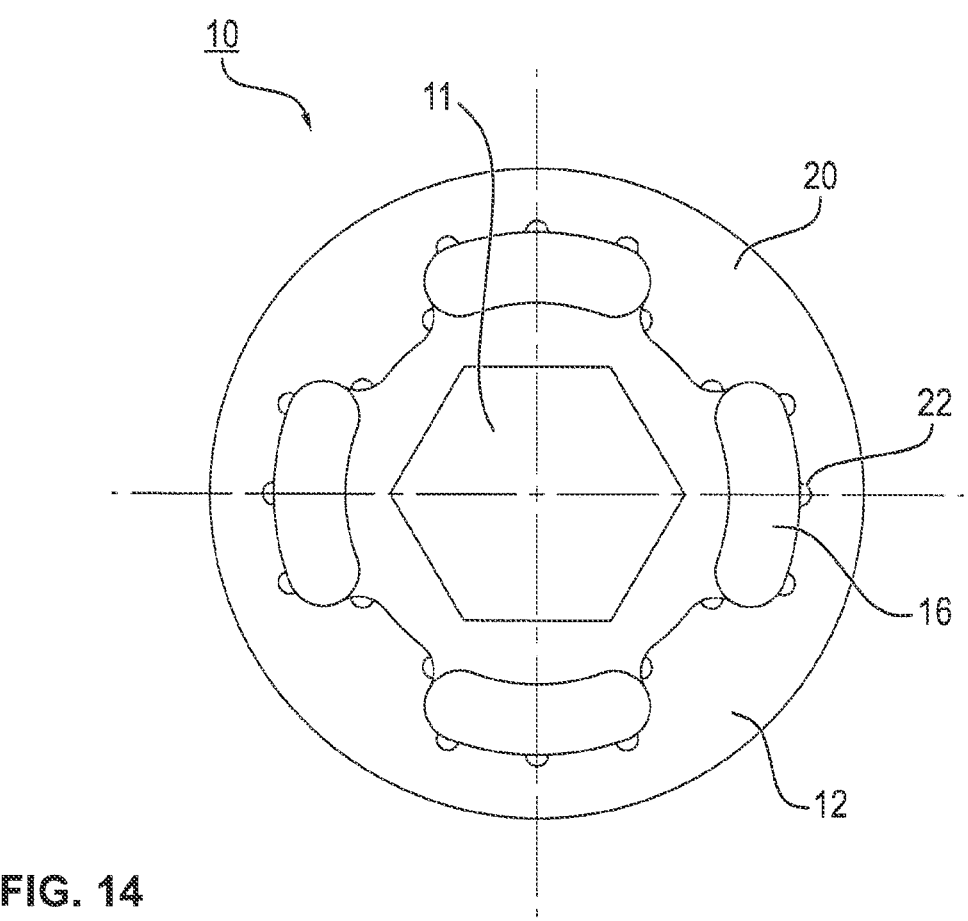
Figure 15:
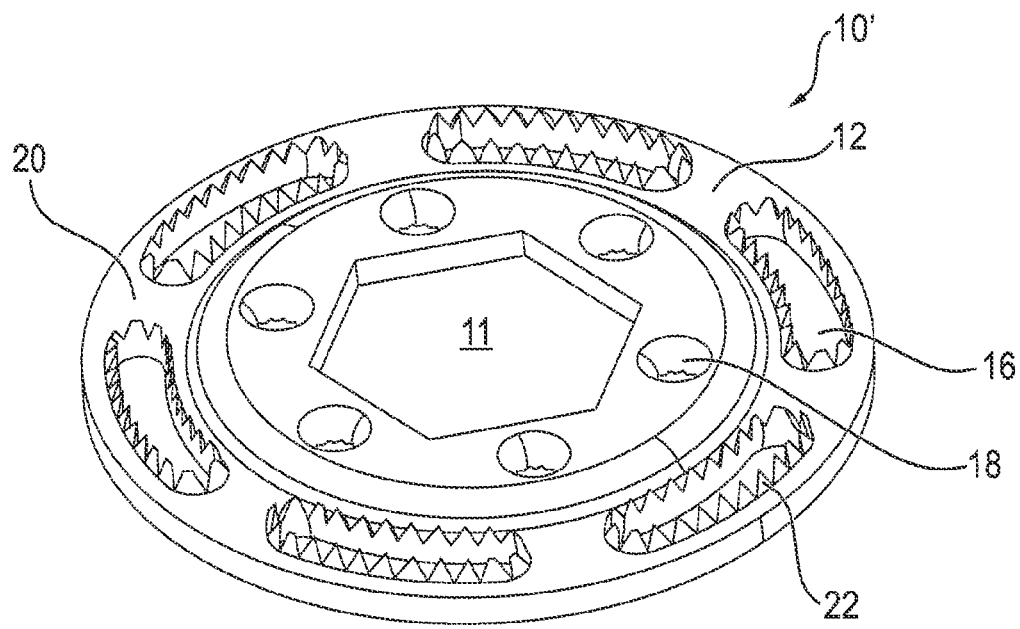
Figure 16:
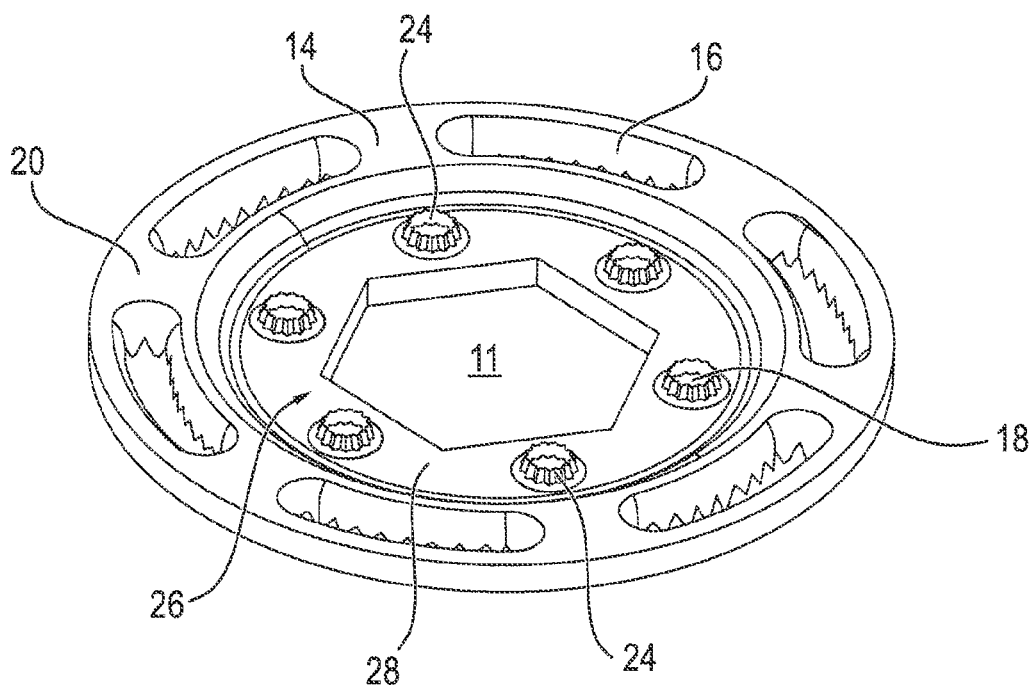
Figure 17:
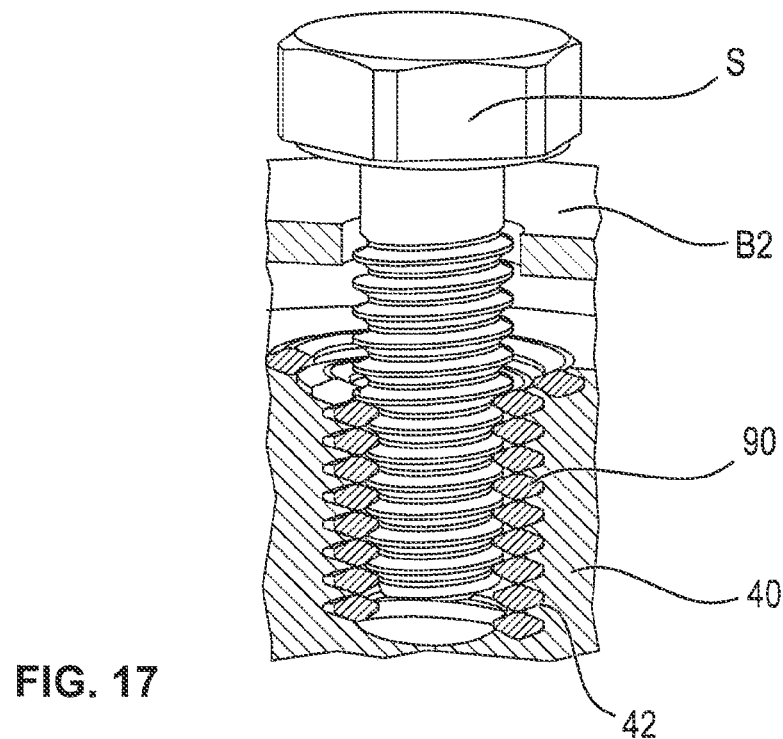
Figure 18:
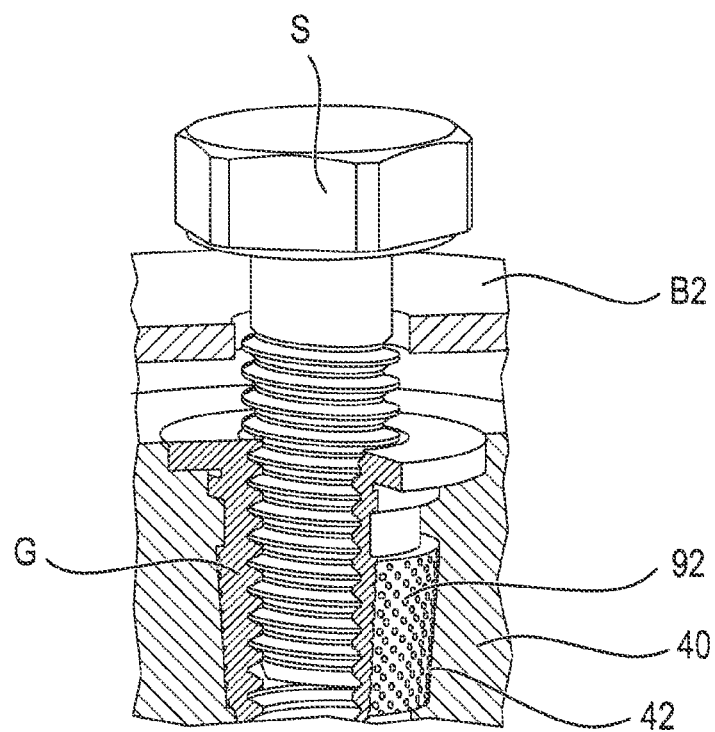
Figure 19:
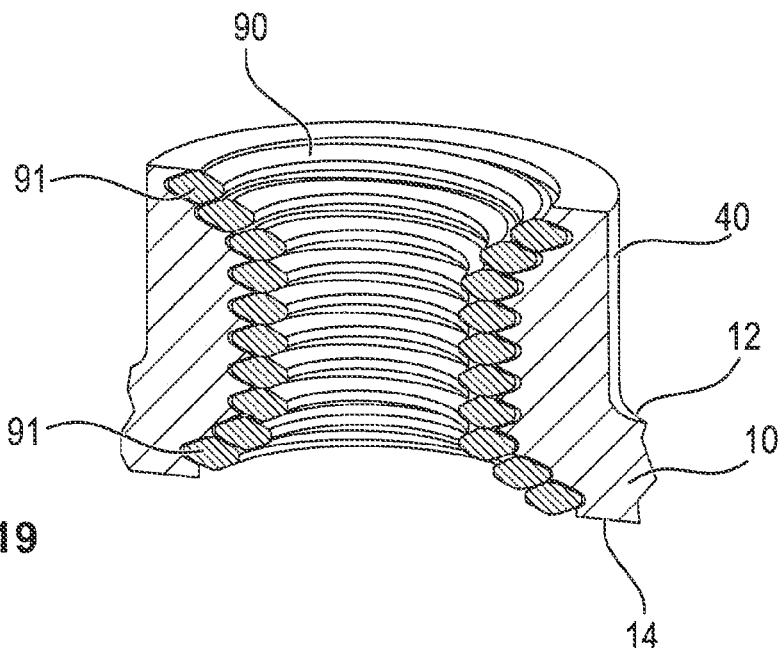
Figure 20:
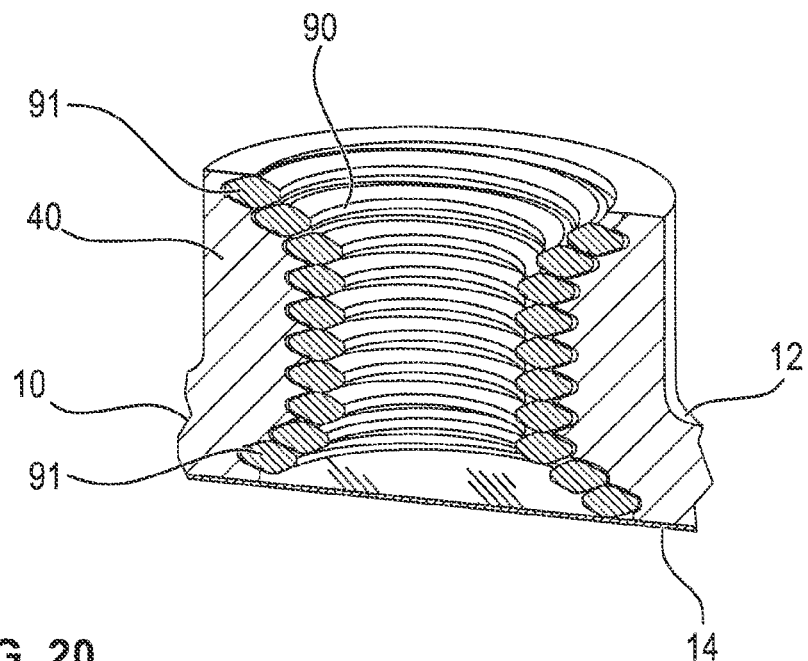
Figure 21:
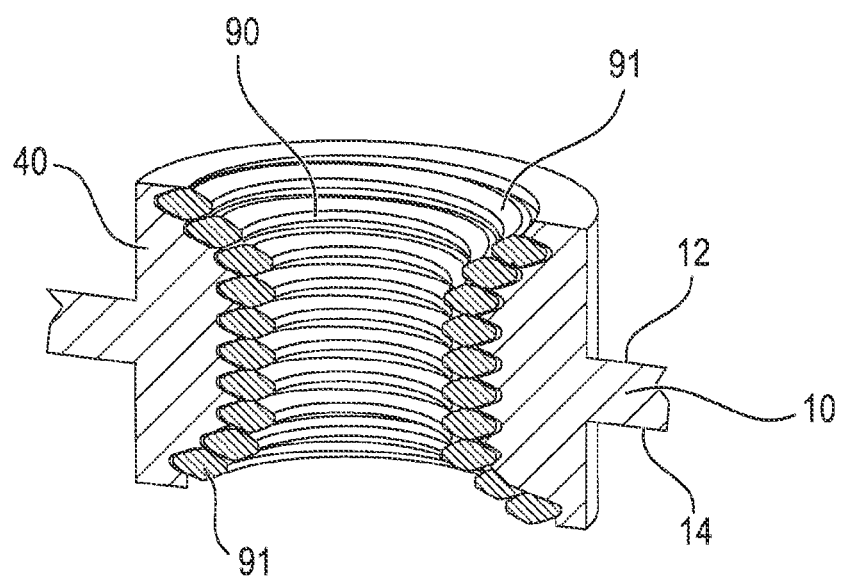
Figure 22:
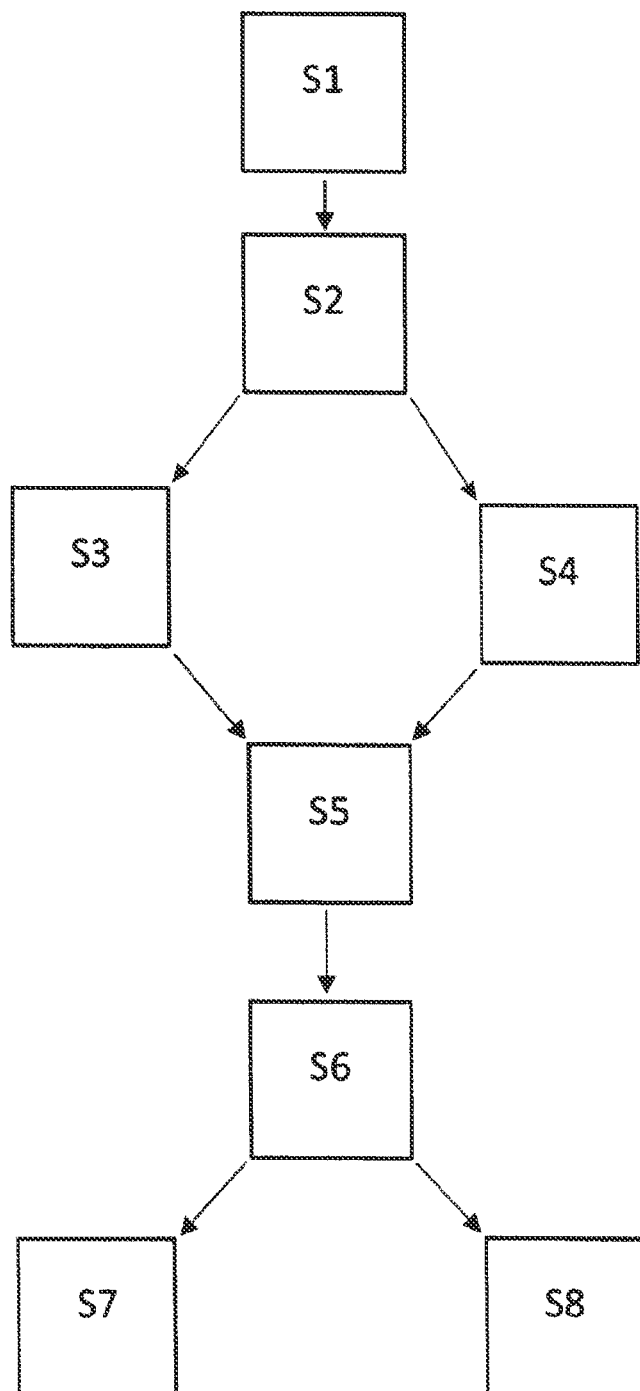
Figure 23:
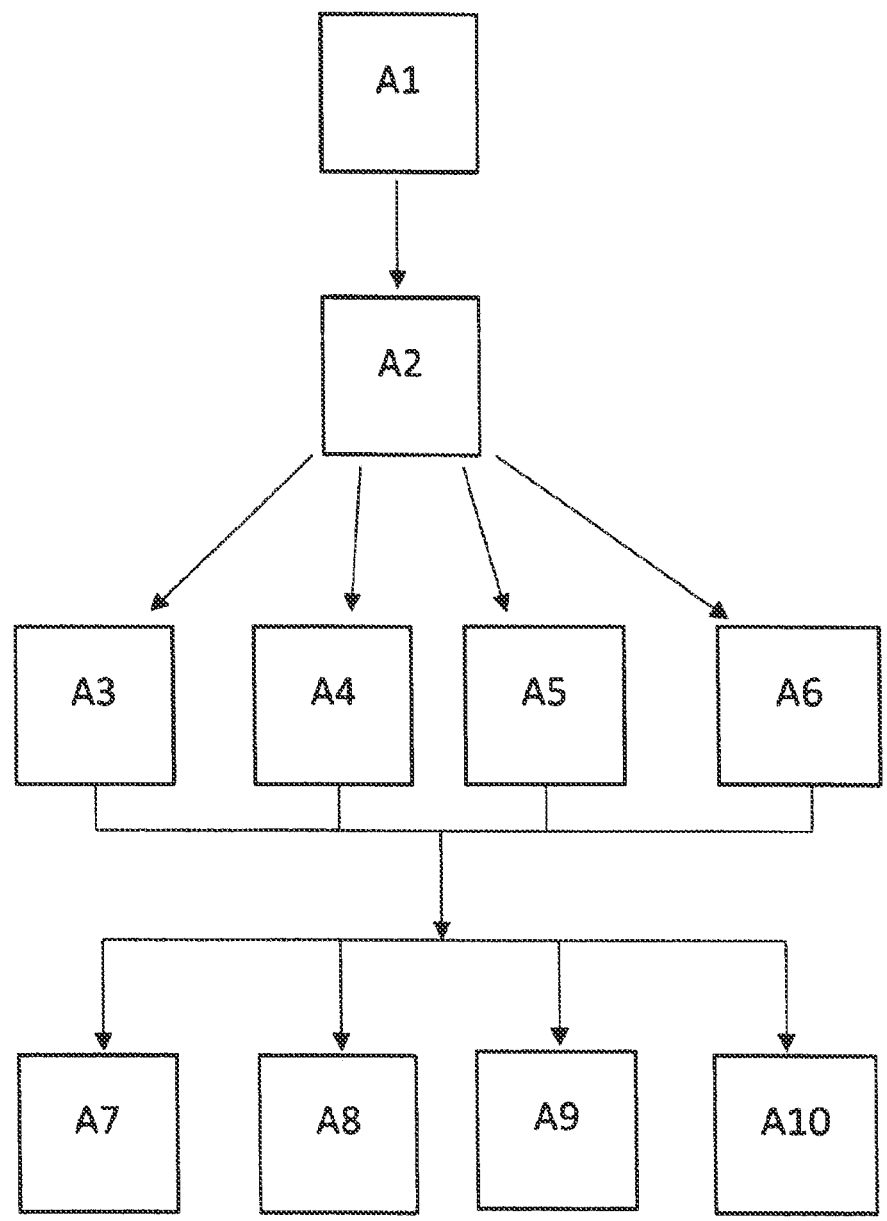
Figure 24:
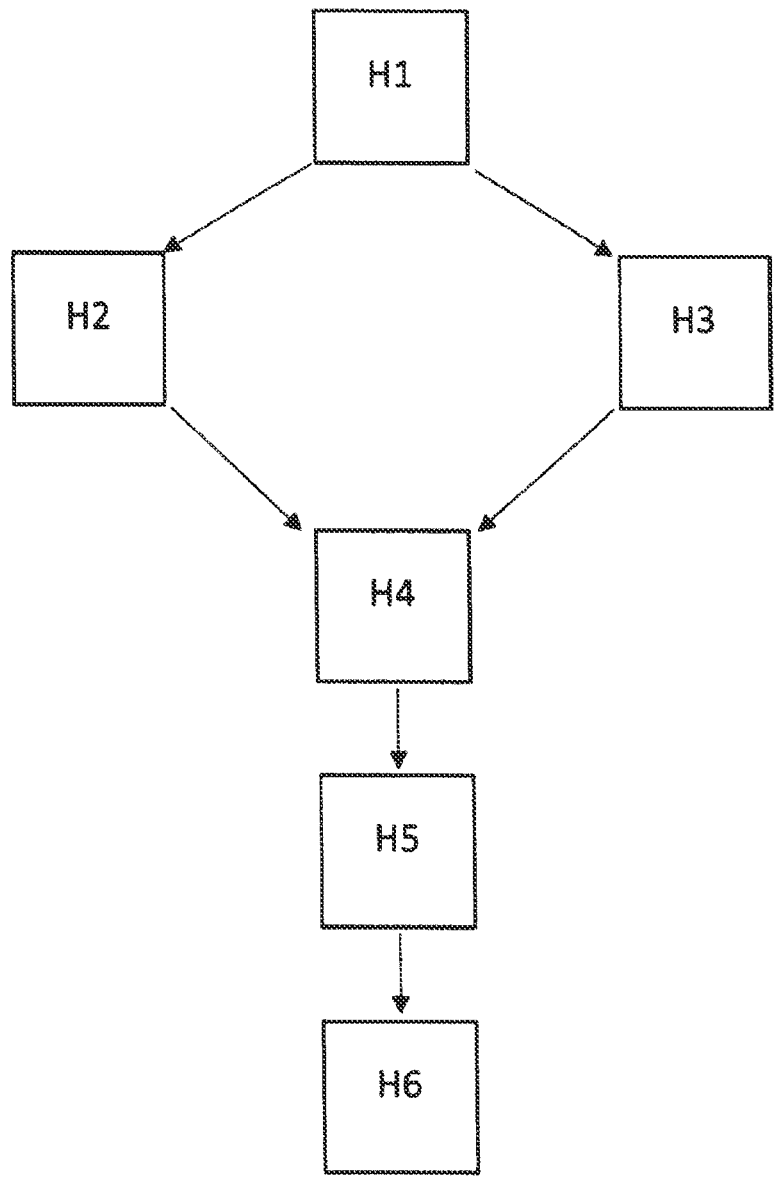

Some embodiments of the present disclosure are discussed in more detail with reference to the accompanying drawings. Showing in:

FIG. 1 a perspective view of an embodiment of a fastening insert with a one-sided shaft, FIG. 2 a perspective view of an embodiment of a fastening insert with a two-sided shaft, FIGS. 3a and 3b a side view and a perspective view of an embodiment of a fastening insert with a two-sided shaft, FIG. 4 a lateral sectional view of an embodiment of the fastening insert with a toothing in a radial outer portion of the insert disc on a fastening side facing away from the shaft, FIG. 5 a lateral sectional view of an embodiment of a fastening element with a two-sided toothing on the insert disc in a radial outer portion, FIG. 6 a lateral sectional view of an embodiment of the fastening insert with an insert disc having a two-sided toothing in a radial outer portion and in a radial central portion, FIG. 7 a lateral sectional view of an embodiment of the fastening insert with a toothing of the insert disc similar to FIG. 6 and a preferred domed central portion on a fastening side of the insert disc facing away from the shaft, FIG. 8 a lateral perspective sectional view of an embodiment of the fastening insert with an inner thread and a wire thread insert with a tapered winding, FIG. 9 a perspective bottom view of an embodiment of the fastening insert, FIG. 10 a side view of the fastening insert according to FIG. 7, FIG. 11 a top view of an embodiment of the fastening insert according to FIG. 10 with a wire thread insert installed in an inner thread of the shaft, FIG. 12 an embodiment of a separate insert disc, which may be connected to a separate shaft, FIG. 13 a side view of the insert disc according to FIG. 12, FIG. 14 a top view of the insert disc according to FIG. 12, FIG. 15 a further embodiment of a separate insert disc in a perspective top view, FIG. 16 a perspective bottom view of the insert disc according to FIG. 15, FIG. 17 an embodiment of a component with a fastening insert embedded therein, wherein a wire thread insert is molded into the shaft, FIG. 18 a connection between a first and a second component by means of the fastening insert, wherein the shaft has a molded-in thread insert, FIG. 19 an embodiment of the fastening insert, wherein a preferred wire thread insert with block-wound windings is molded into its shaft, FIG. 20 a further embodiment of the fastening insert, wherein a wire thread insert with block-wound windings is molded into its shaft and the insert disc closes the shaft, FIG. 21 a further embodiment of the fastening insert, wherein a wire thread insert with block-wound windings is molded into the shaft of said fastening insert and the shaft may project on both sides beyond the insert disc, FIG. 22 a flowchart of an embodiment of a manufacturing method for the fastening insert, FIG. 23 a flowchart of a further manufacturing method for the fastening insert, and FIG. 24 a flowchart of an embodiment of a manufacturing method for a component with an embedded fastening insert.

5. DETAILED DESCRIPTION

FIG. 1 shows a first embodiment of the fastening insert 1, which is composed of an insert disc 10 and a hollow cylindrical shaft 40. The shaft 40 comprises a fastening section 42 which is fixedly connected to the insert disc 10. In addition, the shaft 40 comprises a functional section 44 which extends beyond the insert disc 10 on one side (see FIG. 1) or on both sides (see FIGS. 2 and 3). The functional section 44 may be used to receive and fasten a metallic functional structure 60, as explained in more detail above.

As can be seen from the sectional views of FIGS. 4 to 8, the shaft 40 and the insert disc 10 may be formed integrally or as a single piece. It also may be preferred to manufacture the insert disc 10 and the shaft 40 as separate parts and to connect them to one another in a preferred manufacturing method of the fastening insert 1. FIGS. 15 and 16 show an embodiment of a separate insert disc 10.

Furthermore, in the sectional views of FIGS. 7 and 8, the metallic functional structure 60 can be seen as an example. The metallic functional structure 60 may be a wire thread insert D for reinforcing an inner thread 46 in the functional section 44. The metallic functional structure 60 extends, as can be seen from the example of the wire thread insert D, only inside the hollow cylindrical shaft 40. In particular, the wire thread insert D is arranged at a distance from a closed or open axial end 48 of the shaft 40 on the fastening section 42 inside the shaft 40.

FIG. 7 shows an embodiment of the fastening insert 1, in which the axial end 48 of the shaft 40 is formed closed. The axial end 48 is either closed because the shaft 40 does not have an opening in its fastening portion 42. According to another embodiment, the insert disc 10 is formed entirely closed and closes the shaft 40. Due to this arrangement of the metallic functional structure 60 inside the shaft 40, it is avoided that a direct contact takes place between the functional structure 60 and a component material in which the fastening insert 1 is embedded. This is particularly important in the case of a foam material or a composite material equipped with a carbon fiber reinforcement. This is because such a contact would lead to electrochemical corrosion and thus to a negative influence on the fastening insert 1 and the component.

While the wire thread insert D of FIG. 7 is formed with a constant winding diameter, the wire thread insert D' in FIG. 8 comprises a tapered winding. This tapered winding clamps a screwed-in screw and thus provides a securing means for a connecting element.

As can be seen from FIGS. 2 and 3, the shaft 40 extends on both sides beyond the insert disc 10. While a one-sided shaft 40 (see FIG. 1) only provides a one-sided fastening option, the two-sided shaft 40 provides a two-sided fastening option on a component (not shown).

The fastening insert 1 is used in a component which is manufactured from foam material with preferred fiber reinforcement or from a composite material. It also may be preferred to manufacture the component from several plastic layers. During the component manufacturing, the geometry of the insert disc 10 in particular realizes a positive or form-fit hold in the component material. If the component is manufactured from a composite material with at least a first and a second material layer, then the construction of the insert disc 10 here again ensures at least a positive or form-fit hold in the component material during the component manufacturing and in the finished component.

For this purpose, the insert disc 10 comprises a first 12 and a second fastening side 14. These fastening sides 12, 14 each form abutment faces for adjacent material layers during the component manufacturing or in the later component. The insert disc 10 has a plurality of passage openings 16, 18 arranged off-center about the shaft 40. The passage openings 16, 18 may be formed circularly or as slots. This can be seen from FIGS. 15, 16. The FIGS. 15, 16 show an insert disc 10' separate from the shaft 40. However, the geometric features shown here also apply to an insert disc 10 which is fixedly connected to the shaft 40. An insert disc 10 which is connected to the shaft 40 and with preferred slots 16 is shown in FIG. 3.

According to a first embodiment, the insert disc 10, 10' comprises an annular radial outer portion 20 in which a plurality of openings 16 are arranged. These openings 16 may be uniformly or equally spaced from one another and are formed circularly and/or as a slot.

According to further embodiments, each hole or a selection of holes 16 comprises a circumferential edge projection which is formed as toothing 22, 24. In accordance with an embodiment, the insert disc 10 comprises only a one-sided toothing. In this case, only the toothing 22 extends on one side beyond the fastening side 12 (see FIG. 15). According to a further embodiment, only the toothing 24 extends on one side beyond the fastening side 14 (see FIG. 4). It also may be preferred that, in an insert disc 10, the toothing 22, 24 projects simultaneously over both fastening sides 12, 14, as shown in FIG. 3. The openings 16 enable and support that material layers (not shown) arranged at the adjacent fastening sides 12, 14 interlink and connect to one another by means of resin, liquid plastic or a similar curable medium. In addition, the openings 16 arranged radially on the outer side of the insert disc 10 are used for a preferred pre-fixing of the fastening insert 1 by means of stitching to a fiber, woven fabric, nonwoven fabric or material layer.

The toothing 22, 24 is used to establish a positive or form-fit pre-fixing with a first material layer adjacent to the fastening side 14 and/or the fastening side 12. For this, the corresponding toothing 22, 24 engages in the adjacent material layer and prevents a lateral displacement of the positioned fastening insert 1. In this context, it is of particular advantage if the toothing 22, 24 engages in a fiber layer, a woven fabric, a knitted fabric, a laid structure, a woven fabric complex, a braid, a mat, a nonwoven fabric, a felt mat or a similarly reinforced material layer, since there, the toothing 22, 24 will find a proper hold.

According to an embodiment shown in FIG. 6, the first plurality of openings 16 in the radial outer portion 20 comprise a toothing 22, 24 extending on both sides. According to a further preferred embodiment of the fastening insert 10 in FIGS. 7, 15 and 16, the annular radial outer portion 20 is arranged in a plane. From this plane a central portion 26 of the insert disc 10 domes outwards. By this a concave recess or depression 28 is created. The recess 28 domes in the direction of the functional section 44 of the shaft 40.

As can be seen from the FIGS. 7 and 16, the recess 28 may be formed in different dimensions. According to an application alternative, the recess 28 serves to receive an adhesive in order to be able to pre-fix the fastening insert 1 on a material layer adjacent to the fastening side 14. The recess 28 is at least partially filled with adhesive for this purpose. After the fastening side 14 has been placed onto the material layer, the outer ring 20 circumferentially extending about the recess 28 ensures that as far as possible no adhesive penetrates into the openings 16. The adhesive is then activated and/or cured in order to pre-fix the fastening insert 1 on the material layer. The activating and curing of the adhesive is preferably performed by means of light. For this purpose, the insert disc 10 consists of a transparent plastic or a plastic which can be irradiated by light. Accordingly, a wavelength adjusted to the adhesive is used to irradiate light through the insert disc 10 onto the adhesive and to establish the connection for pre-fixing.

The adhesive may be received in an annular volume or portion which extends circumferentially about the central opening 11 of the insert disc 10. The opening 11 can also open directly into the shaft 40 (FIG. 9), can be closed by said shaft or can be closed by the insert disc 10 itself (FIG. 6).

According to a further embodiment, a radially inner annular web extends into the domed central portion 26. This annular web ends in the axial direction together with the radial outer portion 20. In this way an annular volume of the domed central portion 26 is defined between the annular web and the radial outer portion 20, in which preferably adhesive is received. According to a design of the present disclosure, the annular web is formed by the fastening end 42 of the shaft, which extends up to the axial height of the radial outer portion 20 into the dome of the central portion 26.

According to a further embodiment, the insert disc 10 comprises a second plurality of circular or slot-like openings 18. These may be arranged in the central portion 26, irrespective of whether the central portion 26 comprises a domed recess 28 or not. These openings 18 also comprise a toothing 22, 24 projecting on one or both sides. Since the openings 18 are provided in the central portion 26, they also serve for the compound or bond of adjacent material layers. In addition, the toothing 24 projecting into the dome preferably engages the pre-fixing adhesive. This supports the hold of the fastening insert 1. In addition, the toothing 22 may support a position securing during the component manufacturing by engaging in the adjacent material layer or fiber layer.

As already discussed above, the shaft 40 may be provided in the form of a hollow cylinder. This hollow cylinder extends on one side beyond the insert disc 10. Furthermore, it is advantageous to arrange the shaft 40 in a central non-circular opening 11 of the insert disc 10 with a fastening end 42 adapted to the shape. The combination of the non-circular opening 11 and the non-circular fastening end 42 provides an anti-rotation protection between the insert disc 10 and the shaft 40 (FIG. 15).

According to a further embodiment, the shaft 40 comprises on a radial outer side radially projecting anchoring features such as webs, scales or other suitable profiling. During the component manufacturing, these anchoring features engage the surrounding component material and thus serve for the additional fastening of the fastening insert 1 in the component material.

According to a further embodiment, the hollow cylindrical shaft 40 comprises the metallic functional structure 60 on the radial inner side 45. The functional structure 60 is anchored non-positively or frictionally on the inner side 45, as is preferably the wire thread insert D, which is arranged in the inner thread 46 (FIG. 7, 8). It also may be preferred that a thread insert G is molded into the inner side 45 of the shaft 40 or is also anchored non-positively or frictionally and/or positively or in a form-fit manner in this inner side (see FIG. 18). Preferred embodiments are furthermore a block-wound wire thread insert 90, which has been molded into the inner side 45 (see FIG. 17). Another embodiment is a metallic thread insert 94, which has been embedded into the inner side 45 by means of a thermal embedding method. FIGS. 17, 18 also show a screw S, by means of which a second component B2 is connected to the fastening insert 1;1' of the first component. It also may be preferred to screw the thread insert 92 into the shaft 40 via a self-cutting outer thread, to glue it into the shaft 40 in case of a rough outer face of the thread insert 92 or to clamp it into the shaft 40 in case of a flexible or springy configuration of the thread insert 92.

Referring to the wire thread insert D shown in FIG. 7 as functional structure 60, it is also preferred if it has windings extending beyond the shaft 40. These windings project out of the shaft 40 facing away from the insert disc 10. In addition, at least one of these windings is formed with a smaller cross-section than the other windings (see also FIG. 8). If a screw S is screwed into this smaller winding, it clamps the screw S tight and provides a screw locking.

The inner thread 46 absorbs the mechanical stress transmitted from the wire thread insert D to the shaft 40. Since tapered thread recesses 47 provide a mechanical stress concentration in the shaft 40, the thread recesses 47 have been blunted with continuously or sectionally circumferential free areas or clearances 49 (see FIG. 6). In this way the material load in the shaft 40 is reduced and a hold of the wire thread insert D is supported.

In comparison to the arrangement of FIG. 6, a block-wound wire thread insert 90 is molded or embedded directly into the inner side 45 of the shaft 40 (see FIG. 17). By means of this positive or form-fit connection, which also applies to a molded-in metallic thread insert G (FIG. 18) or a metallic connecting insert, stressing mechanical stresses are transferred from the thread insert G directly into the embedding shaft material.

Based on the above described embodiments of the fastening insert 1; 1' the latter is adapted to be embedded in a component. This creates the basis for a connection with another component B2. For this, preferably a connecting means, may be a screw S, may be screwed into or fastened in the fastening insert 1; 1' through an opening in the second component B2 in order to establish the connection between the first and the second component B2 (see FIG. 17, 18).

A further embodiment of the fastening insert 1; 1' is shown in FIGS. 19 to 21. In the shaft 40 of the fastening insert 1; 1' of FIG. 17 a block-wound wire thread insert 90 with only one fastening flange 91 is arranged on an axial side of the wire thread insert 90 and of the shaft 40. In a further design of this advantageous construction, the fastening insert 1; 1' of FIGS. 19 to 21 comprises a fastening flange 91 at both axial end faces or ends, respectively. The fastening flange 91, whether provided on one or both sides, supports a secure hold of the wire thread insert 90 in the shaft 40. In addition, the fastening flange 91 stabilizes and protects the respective adjacent screw-in opening for a screw S in the shaft 40 against damage and dissipates mechanical fastening stresses of the screw S into the shaft material. The embodiment according to FIG. 19 uses a fastening flange 91 at each of the openings of the shaft 40. According to a construction alternative, it is preferred to arrange the fastening side 14 flush with a component wall.

According to a different construction alternative, the insert disc 10 of FIG. 19 is embedded in a component material. In order to avoid possible contact with a reinforcing fiber, it also may be preferred to close the opening of the shaft 40 adjacent to the insert disc 10. For this, the insert disc 10 is formed continuously according to an embodiment as shown in FIG. 20. Alternatively to this, the opening of the shaft 40 adjacent to the insert disc 10 is covered with a film, a small-area intermediate layer or the like to eliminate contact with e.g. carbon fibers.

According to a further embodiment of the fastening insert 1; 1', the shaft 40 is formed on two sides with respect to the insert disc 10. On both fastening sides 12, 14 it extends beyond these. The block-wound wire thread insert 90 also may be molded into the inner side of the shaft 40. This comprises a fastening flange 91 on each axial end, wherein only one fastening flange 91 or another thread insert 92 may be used. This construction of the fastening insert 1; 1' provides a two-sided connection possibility on a component with this embedded fastening insert 1; 1'. It is also preferred to screw a connecting means, e.g. the screw S, by means of this fastening insert 1; 1' through a component with this embedded fastening insert 1; 1'.

The fastening insert 1; 1' is fixedly arranged in the first component made of foam material, plastic or composite material. The component consists of a structural or integral foam with a reinforcing fiber component. Accordingly, the fastening insert 1; 1' is foamed into this foam material. Reinforcing fibers are glass fibers, carbon fibers or aramid fibers. Carbon fibers are preferred due to the mechanical strength gain of the foam material.

It also may be preferred that the component consists of a composite material with at least one fastening insert 1; 1' embedded therein. According to an embodiment, the component material consists of a woven fabric, a nonwoven fabric or felt and a polymer matrix. A suitable polymer matrix is formed by known epoxy or cyanate resins, with which the woven fabric, nonwoven fabric or felt is impregnated and then cured. It may be preferred to use carbon fibers in combination with a polymer matrix, because they improve the mechanical properties of the component most advantageously compared to other fiber materials. Depending on the component application, the carbon fibers are processed in different fiber configurations as short fibers, long fibers, mats with non-ordered fibers, as woven fabrics, knitted fabrics, laid structures, fabric complexes or as braids in the resin matrix or generally in the polymer matrix. Accordingly, one or more of the abovementioned fiber forms may be provided as laminate, pre-preg or other known means, impregnated with resin and then cured or cured without impregnation. Therefore, the component is then provided as a composite material with a reinforcing carbon fiber according to one or more of the above fiber configurations.

According to a further embodiment, the fastening insert 1; 1' is injection-molded into an organic sheet or overmolded to an organic sheet.

Since the fastening insert 1; 1' is embedded in the composite material, a mechanical load introduced into the shaft 40 via a connecting element is transmitted to the component or diverted into the component material via the insert disc 10. It is advantageous here that the insert disc 10 creates a large-area, two-sided connection in the component material. Since the resin or polymer matrix floods through the openings 16, 18 of the insert disc 10 during the component manufacturing and cures there, the fastening insert 1; 1' is embedded in the component material by means of a positive or form-fit and material-bond connection. In addition to this, the one-sided or two-sided toothing 22, 24 provides an additional positive or form-fit connection to the adjacent fiber layers or metal layers during the component manufacturing and to the adjacent material layers in the later composite material. This additional anchoring in the component material provides additional stability and lifespan of the connection made of the component and the fastening insert 1; 1'.

The present disclosure also includes a manufacturing method for the T-shaped fastening insert 1; 1' described above. In the following, the individual steps of the manufacturing method will also be explained in parallel with reference to the flow chart in FIG. 22. First, in step S1 an injection mold is provided, the mold cavity of which, in complementary form, dictates the structural features of the fastening insert 1; 1'. In accordance with a preferred embodiment of the present invention, the injection mold defines the insert disc 10 already described above. The latter comprises two opposite fastening sides 12, 14 with the several passage openings 16, 18. In addition, at these openings, toothings 22, 24 are formed which extend circumferentially continuously or circumferentially in sections and which project on one or both sides beyond the respective adjacent fastening side 12, 18.

Depending on which construction of the fastening insert 1; 1' is to be manufactured, for example, a core is inserted into the injection mold or a shape design of the injection mold dictates the interior design of the inner side 45 of the shaft 40. Thus the core may have the shape of a thread, which then defines the inner thread 46 on the radial inner wall of the shaft 40 when filling the mold cavity with plastic. In the same way as the inner thread 46 is already manufactured during the manufacturing of the fastening insert 1; 1', a wire thread insert 90 or thread insert 92 or a connecting insert is positioned in the mold cavity in step S2 according to further preferred alternatives of the manufacturing method. Only after these metallic functional structures 60 to be molded in have been arranged or positioned in the mold cavity is the mold cavity filled with plastic. In this way, a molding of the wire thread insert 90 or the thread insert 92 or the connecting insert takes place when filling the mold cavity with liquid plastic (S3, S4).

The filling of the mold cavity with at least one flowing plastic S3, S4 can also be carried out according to different preferred manufacturing routes. This is because, depending on the mechanical loads that the later fastening insert 1; 1' has to endure, different plastics or different fiber reinforcement degrees or proportions or amounts can be selected, for example for the molding or shaping of the insert disc 10 and the shaft 40. Accordingly, the fastening insert 1; 1' is generally manufactured using a one-component injection molding method in which only one plastic is used to manufacture the entire fastening insert 1; 1'. Alternatively, a two-component injection molding method is used, in which two different plastics form the insert disc 10 on the one hand and the shaft 40 on the other. Therefore, in step S3 it may be preferred to fill the mold cavity with only one plastic, so that the fastening insert 1; 1' and in particular the insert disc 10 and the shaft 40 are manufactured with the same material. As an alternative to this, it is preferred to fill the mold cavity with a first plastic in the portion of the insert disc 10 to be molded and with a second plastic in the portion of the shaft 40 so that the fastening insert 1; 1' is manufactured in a two-component injection molding method (step S4).

Thus, while the choice of plastics for the insert disc 10 and the shaft 40 can already be different, it also may be preferred to vary the proportion of reinforcing fibers and the type and configuration of the reinforcing fibers in the plastics used. Accordingly, for the manufacturing of the fastening insert 1; 1' in the two-component injection molding method, the following manufacturing routes result. According to a first embodiment, the first and second plastics used are the same, although the proportions or amounts of reinforcing fibers in the plastic used for the insert disc 10 and the shaft 40 are different. According to a further embodiment, a chemical composition of the first and second plastic is different. According to a third alternative of the method, a chemical composition of the first and second plastics is different and different proportions or amounts of reinforcing fibers are used in the first and second plastics. These design options allow for an optimal adjustment of the mechanical properties of the insert disc 10 and the shaft 40 to the respective component situation.

For the fastening insert 1; 1', initially, plastics which meet the mechanical, chemical and thermal requirements of the respective application case are selected independently of the manufacturing route of the fastening insert 1; 1'. Fiber-reinforced plastics with glass fibers, carbon fibers, aramid fibers and/or textile fibers or fiber combinations or fiber-like configurations may be preferred. Plastics reinforced with carbon fibers (CFRP) may be preferred, unless the shaft 40 is combined with a metallic functional structure 60. When combined with the functional structure 60, preferably all non-carbon fibers are used. A selection of examples of plastics with and without one of the above fiber reinforcements are PE, PA, PP, PS, PVC, POM, PMMA, PC, PBT, EP, PPS, PSU and PTFE.

With regard to the insert disc 10, PSU is used as material according to a preferred embodiment. PSU is a transparent plastic or at least a plastic which can be irradiated by light. The optical properties change with the proportion or amount of reinforcing fibers in the material. PSU is preferably used in combination with a glass fiber reinforcement. According to a preferred embodiment, the shaft 40 and the insert disc 10; 10' are made of PSU without fiber reinforcement. According to a further embodiment, the shaft 40 consists of PSU with up to 60% glass fiber reinforcement. Since with this high proportion of glass fiber reinforcement PSU is no longer transparent and cannot be irradiated, the matching insert disc 10; 10' preferably made of PSU without glass fiber reinforcement or with a proportion or amount of less than 60% glass fiber reinforcement for the insert disc 10; 10' is used. Since the plastics used for the shaft 40 and the insert disc 10; 10' have the same composition, they are easy to connect by friction welding or other thermal methods.

In the context of the above-described manufacturing method, it may also be ensured that the insert disc 10 is made of a transparent plastic or at least of a plastic which can be irradiated by light. This is because only this constructive design of the fastening insert 1; 1' makes it possible for the fastening insert 1; 1' to be pre-fixed on a material layer or a fiber layer by means of light-curing adhesive during the later component manufacturing (see above).

After the fastening insert 1; 1' has been manufactured by one of the injection molding methods, the wire thread insert D is installed in the inner thread 46 of the radial inner side 45 of the shaft 40 in the further step S7. This installation step takes place after the demolding of the fastening insert from the component mold.

As an alternative to the installation of the wire thread insert D, the thread insert 92 or the connecting insert is installed in the shaft 40 by means of a thermal or mechanical method after demolding the fastening insert 1; 1'. One of the preferred thermal embedding methods is the heating element welding method. Contact heat is transferred to the metallic functional structure 60 by a heating element. This heat is transferred from the metallic functional structure 60 to the joining zone of the plastic, i.e. to the inner side of the shaft 40. During the melting of the plastic of the shaft 40 in the portion of the contact surface, i.e. between the inner side 45 and the outer side of the functional structure 60, the joining process takes place. At this, the plasticized plastic is displaced into a profile or structure existing on the radial outer side of the functional structure 60, so that a positive connection is created.

Alternatively, it also may be preferred to heat the metallic functional structure contact-free by means of an electromagnetic alternating field. Here, too, the plastic plasticizes on the contact surface between the functional structure 60 and the inner side 45 of the shaft 40 and is then molded into the outer structure of the functional structure 60. Another preferred alternative is ultrasonic welding, in which the plastic of the shaft 40 is plasticized by vibration absorption and is then molded into the outer side of the functional structure 60.

One of the mechanical methods mentioned above for installing a functional structure 60 in the shaft 40 is, for example, screwing in or clamping a thread insert or similar construction in the shaft 40.

Since the installing of the functional structure 60 is not tied to the manufacturing method of the fastening insert, this step can take place later and independently of the manufacturing method. This opens up the possibility that the installation can be carried out by the manufacturer of the fastening insert 1; 1' in the same way as by its customer. In addition, the installation can take place in the separate fastening insert 1; 1' or in a fastening insert 1; 1' embedded in the component.

In a further manufacturing method for the T-shaped fastening insert 1; 1', the insert disc 10 of the fastening insert is first provided from plastic in step A1. According to one of the embodiments, which has already been described above, the insert disc 10 consists of transparent plastic or plastic which can be irradiated by light in order to be able to pre-fix the fastening insert 1; 1' during the component manufacturing. The insert disc 10 comprises the opposite fastening sides 12, 14 with several passage openings 16, 18 arranged off-center about the shaft 40.

In a second step A2, the shaft 40 of the fastening insert 1; 1' is provided. Since the fastening insert 1; 1' is not manufactured in a continuous injection molding procedure, now a connection takes place between the insert disc 10 and the shaft 40 by means of different methods. According to a method route, the shaft 40 is mechanically clamped or latched into a central opening 11 of the insert disc 10. Preferably, this central opening 11 comprises a non-circular shape, so that in addition to the mechanical connection between the shaft 40 and the insert disc 10, an anti-rotation protection is realized by this connection. As an alternative to this mechanical connecting, it also may be preferred to connect the shaft 40 and the insert disc 10 using a thermal method, such as ultrasonic welding or friction welding. These methods are generally known. Here, at the interface between the shaft 40 and the insert disc 10, the adjacent plastics are plasticized so that they can form a reliable connection with each other. As a third method route, the shaft 40 is adhesively fastened to the insert disc 10 (step A6).

It also may be preferred to press together or rivet the shaft 40 and the insert disc 10 to each other.

Alternatively to the manufacturing methods described above, it further may be preferred to provide an insert disc of any configuration and subsequently connect it to the shaft 40. The fastening insert 1;1' manufactured in this way is distinguished in particular by the combination of the shaft 40 with a metallic functional structure 60. The connecting between the insert disc 10 and the shaft 40 is also carried out according to the alternative manufacturing routes described above. In this respect, the shaft 40 can be clamped or locked mechanically in the insert disc, wherein a non-circular central opening in the insert disc may be used. Alternatively to this, a thermal connecting takes place between the shaft and the insert disc, which may be realized by means of ultrasonic welding or friction welding. In addition, it is preferred to adhesively connect the insert disc and the shaft 40.

Accordingly, as another manufacturing step, a thread 46 is provided on the radial inner side 45 of the shaft 40 in order to be able to install the wire thread insert D therein (step A7). In an alternative manufacturing route, the thread insert 92 or a connecting insert is installed in the shaft 40 by means of a thermal (step A8) or a mechanical method (step A9). In the same way, an adhesive method can also be used to fasten the thread insert 92 or the connecting insert in the shaft 40. These installation steps may be carried out before or after the insert disc 10 has been connected to the shaft 40.

In this manufacturing method, it is of course also preferred to provide the insert disc 10 with the two fastening sides 12, 14 arranged opposite to one another and several passage openings 16, 18 arranged off-center about the shaft 40. In addition, the insert disc comprises the toothing 22, 24 already described above, which extends beyond the respective fastening side 12, 14 on one or both sides.

If the metallic functional structure 60 has not already been installed in the manufacturing method of the fastening insert 1; 1', the present disclosure also includes an equipment method for the fastening insert 1; 1'. In the first step a of this equipment method, the T-shaped fastening insert 1; 1' or a component with a T-shaped fastening insert 1; 1' fastened thereon is first provided. In a further step b, the wire thread insert D is then installed in the inner thread 46 of the shaft 40 of the T-shaped fastening insert 1; 1'. Alternatively, it also may be preferred to install the thread insert 92 or a connecting insert in the shaft 40 of the fastening insert 1; 1' by means of the thermal or mechanical methods already described above or by means of an adhesive method (step c).

The present disclosure further includes a manufacturing method for a component made of a composite material, a plastic material or a laminate combination in which the T-shaped fastening insert 1; 1' described above is used in its embodiments. The manufacturing method may benefit from the construction of the fastening insert 1; 1', as this already connects with at least one adjacent material layer at least positively or in a form-fit manner and may be positively and/or material-bonded during the manufacturing method. In addition, the fastening insert 1; 1' provides at least one additional positive or form-fit connection within the component material due to its constructive features, which supports an additional anchoring and thus durability and load-bearing capacity of the connection consisting of the component and the fastening insert 1; 1'.

As already described above, the fastening insert 1; 1' may be used in combination with fiber-reinforced materials, especially in CFRP components. The fiber-reinforced composite materials are manufactured from well-known fiber matrix semi-finished products. A fiber matrix semi-finished product is understood to be a semi-finished product from a reinforcing fiber which is impregnated with or is to be impregnated with a plastic matrix or which is pressed into this matrix or with it. Known examples of such semi-finished products are pre-pregs. This semi-finished product consists of continuous fibers impregnated with a plastic matrix, such as a polymer matrix. The fibers either form a unidirectional layer or they are present as a woven fabric, knitted fabric, braid, woven fabric complex, mat or laid structure. Other fiber matrix semi-finished products for fiber-reinforced components, especially for CFRP components, are SMC (Sheet Molding Compound) and BMC (Bulk Molding Compound). SMC are mostly plate-shaped and are processed in a press mold. Thereby fastening inserts 1; 1' can be inserted into the press mold, pressed into the plates and be processed. BMC is a formless mass which is processed as a pressing compound or material using the well-known hot pressing technology. BMCs can also be processed using injection molding technology. At this, the reinforcing fibers are so short that they can flow through the mold during pressing or injecting with the reaction resin. Furthermore, fiber-containing organic sheets, such as organic sheets with carbon fibers, which are processed using hybrid molding, are regarded as composite materials. This also includes woven fabrics, nonwoven fabrics and felts that are processed in a resin matrix or generally in a plastic matrix.

In a first method step H1, a component mold with at least a first material layer, preferably a first fiber layer, is provided. The component shape dictates or determines a complementary shape of a component to be manufactured (see FIG. 24).

The component manufacturing uses well-known processing methods for fiber-reinforced composite materials. Therefore, resin transfer molding (RTM), the pre-preg pressing method as well as the autoclave technology are preferred in this context, to name only a few selected examples. With the resin transfer molding (RTM) method, dry reinforcing material in a mold is first transferred to a so-called pre-form via a binder. Here, by stitching and embroidery methods of the pre-forms, the fiber orientation can be adjusted to the load cases in the component by selective placement. This textile preform link is then inserted into the component mold and is injected or infiltrated with matrix resin after closing the mold. Then the curing takes place under temperature and pressure.

In the aforementioned pre-preg pressing method, semi-finished fiber products (pre-pregs) pre-impregnated with resin are pressed into shape in a heated component mold and are cured. First, the pre-preg, i.e. a pre-impregnated fiber-reinforced material, is trimmed and arranged in the form of layers in the component mold. Then a forming punch adapted to the shape of the component serves as a tool for the forming of the inserted material layers. While the forming takes place under the influence of pressure and heat, the pressed materials are subsequently cured to form a component. Then, here too, the manufactured component is demolded from the mold.

In the above-mentioned autoclave technology, fiber matrix semi-finished products in the form of trimmed material layers, mats or the like are also prepared for the component mold. The textile layers of fiber-reinforcing material, in particular carbon fibers, which are inserted into the component mold as woven fabrics, knitted fabrics, braids, woven fabric complexes, mats or laid structures and in trimmed form, are of particular importance here. A resin is then injected into the closed component mold in order to mold and cure the component. While the proportion or amount of fiber volume in the component is relatively high, the final curing of the resin matrix takes place under the influence of a vacuum and at temperatures of approximately 100°-200°. Afterwards, the component can be demolded.

The above mentioned method routes use in the same way at least one first material layer or a plurality of material layers which are inserted into the component mold. This first material layer may be a first fiber layer, wherein the term fiber layer also refers to a layer of a fiber matrix semi-finished product, which may comprise a reinforcement of carbon fibers.

In the further course of the manufacturing method, the fastening insert 1; 1' is positioned and pre-fixed on the at least one first material layer. If the pre-fixing in step H2 is carried out by a positive or form-fit connection, the toothing 24 of the insert disc 10 of the fastening insert 1; 1' engages in the first material layer when the fastening insert is positioned on this first material layer. Since the toothing 24 may interlock in the first material layer, a position securing positive or form-fit connection is also established by this.

In addition thereto or alternatively, in step H3, a pre-fixing of the fastening insert 1; 1' takes place by means of a material-bond connection. For this, adhesive is applied to the fastening side 14 of the fastening insert 1; 1' facing the first material layer in order to pre-fix the fastening insert 1; 1' to the first material layer. In this context, it may be preferred that the adhesive in fact only serves for a pre-fixing, but not for a strong or loadable mechanical hold of the fastening insert 1; 1' on the first material layer. Due to this reduced demand on the material-bond connection to be established, only a small adhesive volume on the first fastening side 14 is sufficient to ensure a position stability of the fastening insert on the first material layer.

In this context, it also may be preferred to use an adhesive that can be activated and/or cured by means of light and/or heat. If light of a certain wavelength is used to activate and/or cure the adhesive, the fastening insert 1; 1' comprises an insert disc 10 which consists of transparent plastic or of plastic which can be irradiated by light. This special constructive design is explained in more detail above. It is further advantageous if the insert disc 10 comprises the concavely domed portion 28 on its fastening side 14 facing the first material layer in order to receive the adhesive volume. This is because this concavely domed portion 28 ensures that the adhesive remains in place preferably only in this portion even after it has been placed on the first material layer. Doing so prevents curing adhesive from blocking existing passage openings in the insert disc 10, which, however, are intended for the cross-linking of adjacent material layers. Alternatively, it is also preferred to pre-fix the fastening insert 1; 1' with an adhesive film, a stitching method or a similar position securing means.

After the fastening insert 1; 1' has been suitably positioned and pre-fixed, at least one second material layer, preferably a second fiber layer, may be arranged in step H4 on the second fastening side 12 of the fastening insert 1; 1' facing the second material layer. As is well known, it must be ensured that the second material layer does not close or cover the shaft 40 of the fastening insert 1; 1' but surrounds it. Since the second fiber layer also preferably consists of a fiber matrix semi-finished product, in particular of a carbon fiber reinforced matrix semi-finished product, it is present as woven fabric, knitted fabric, braid, woven fabric complex, mat or laid structure. In this arrangement, adjacent portions in this second material layer can be rearranged in such a manner that the shaft 40 can be inserted in the second material layer through an opening created in this way. In this way it is ensured that the second material layer surrounds the shaft 40 of the fastening insert 1; 1' and does not cover it.

Since the insert disc 10 comprises a preferred toothing 22 on the fastening side 12 as well, said toothing may engage in the second material layer. In this way, a fixing of the second fastening side 12 of the insert disc 10 to the second material layer takes place in step H5.

With regard to the pre-fixing of the fastening insert 1; 1', it also may be preferred to stitch it to the first material layer and/or to the second material layer. This connection, too, ensures that the fastening insert 1; 1' retains its position during the component manufacturing and that the component is molded with the appropriate arrangement of the fastening insert 1; 1'.

At last, the connection of the fastening insert 1; 1' and at least the first material layer is embedded so that a fiber-reinforced plastic is provided. During this embedding, the stack of the first and the second material layers with the intermediate fastening insert 1; 1' is impregnated with a liquid resin material. This resin material is partly provided in the fiber matrix semi-finished products which are already pre-manufactured and inserted into the mold. In addition, further resin material may be added to the component mold so that the component can then be molded under the influence of pressure and heat. After the multi-layer composite material constituting the component has cured, it is demolded from the component mold. In order to protect the inside of the shaft 40 from contamination during these steps, the shaft 40 is preferably closed with a removable plug.

It may be preferred that the component is manufactured with a carbon fiber reinforcement of various configurations. In addition, the RTM method described above may be used for the component manufacturing. In the same way it may be preferred to mold the fiber matrix semi-finished products to the desired component by cold pressing or hot pressing.

6. Summary of the Embodiments of the First Configuration of the Invention

1. Fastening insert of plastic with a T-shaped configuration consisting of an insert disc and a shaft which is fixedly arranged on the insert disc via a fastening section and projects beyond the insert disc on one side or on both sides with a functional section, of which at least the insert disc can be positioned in a foam material or a composite material during a component manufacturing and can be fastened therein by the component manufacturing, in which the insert disc comprises:
   a. two fastening sides arranged opposite one another, each forming at least partially an abutment face for the material layer,
   b. a plurality of passage openings arranged off-center about the shaft, which connect the fastening sides to one another and of which at least one passage opening has an edge projection extending circumferentially continuously or circumferentially in sections which is formed as toothing and extends on one side or on both sides beyond the respective fastening side of the insert disc.

2. Fastening insert according to embodiment 1, the insert disc of which comprises at least one annular circumferential radial outer portion, in which a first plurality of the passage openings, which are formed circularly and/or as a slot, is arranged uniformly or equally spaced from one another.

3. Fastening insert according to embodiment 2, the shaft of which is configured cylindrically or hollow-cylindrically and in the insert disc of which the first plurality of passage openings in the outer portion are arc-shaped slots, the toothing of which extends on both sides beyond the fastening sides of the insert disc.

4. Fastening insert according to embodiment 2, wherein the annular radial outer portion of the insert disc is arranged in a plane and surrounds a dome-shaped central portion which is domed out of this plane toward the functional section of the shaft, wherein a concave recess of the central portion defines an at least annular radial free space which is arranged radially outwardly with respect to an outer shaft face.

5. Fastening insert according to embodiment 4, in the domed central portion of which a second plurality of the passage openings, which are formed circularly and/or as a slot, is arranged uniformly or equally spaced from one another.

6. Fastening insert according to embodiment 5, the first plurality of the passage openings of which and the second plurality of the passage openings of which each have a toothing projecting on one side, which is oriented oppositely to one another.

7. Fastening insert according to one of the embodiments 4 to 6, in which the domed central portion surrounds an annular web located radially inwards, which ends in the axial direction with a radial outer edge of the domed central portion and defines an annular volume within the domed central portion.

8. Fastening insert according to one of the preceding embodiments 1, 2 or 4 to 7, the shaft of which is provided as a bolt or hollow cylinder extending on one side beyond the insert disc.

9. Fastening insert according to embodiment 8, the shaft of which is arranged in a central non-circular opening of the insert disc with a fastening end adapted to the form so that an anti-rotation protection is provided between the insert disc and the shaft, and/or the shaft of which comprises radially projecting anchoring features on a radial outer side in order to fasten the fastening insert via the shaft in a composite material.

10. Fastening insert according to one of the preceding embodiments, at least the insert disc of which consists of a plastic which can be irradiated by light.

11. Fastening insert according to one of the preceding embodiments, the shaft of which is formed closed at an end face adjacent to the insert disc and/or the insert disc of which is formed closed in a central portion adjacent to the shaft.

12. Component consisting of a foam material or a composite material in which a fastening insert according to one of the embodiments 1 to 10 is fixedly arranged within the foam material or the composite material.

13. Connection of at least one first and one second component, of which at least the first component is a component according to embodiment 12, in order to connect the at least one first and the one second component by means of a fastening means and the fastening insert in the first component to one another.

14. Manufacturing method of a T-shaped fastening insert, in particular a fastening insert according to one of the preceding embodiments 1 to 10, which comprises the following steps:
   a. providing an injection mold, the mold cavity of which, in complementary form, dictates the structural features of the fastening insert (S1)
   b. filling the mold cavity with at least one flowing plastic, (S3, S4)
   c. curing of the plastic (S5) enclosed in the mold cavity; and d. demolding the fastening insert from the injection mold (S6).

15. Manufacturing method according to embodiment 14, which further comprises:
filling the mold cavity with only one plastic, so that the fastening insert is produced in a one-component injection molding method (S3) or filling the mold cavity in the portion of the insert disc to be molded with a first plastic and in the portion of the shaft with a second plastic, so that the fastening insert is manufactured in a two-component injection molding method (S4).

16. Manufacturing method according to embodiment 14, second alternative, in which the first and the second plastic are identical and differ in a proportion or amount of reinforcing fibers or in which the first and the second plastic are different in a chemical composition or in which the first and the second plastic are different in a chemical composition and have different proportions or amounts of reinforcing fibers.

17. Manufacturing method according to one of the embodiments 14 to 16, in which at least the insert disc, after manufacturing from the first plastic, is transparent or can be irradiated at least by light.

18. Manufacturing method according to one of the embodiments 14 to 17, in which the injection mold defines an insert disc which has two fastening sides arranged opposite one another with a plurality of passage openings arranged off-center about the shaft, which passage openings connect the fastening sides to one another and of which at least one passage opening comprises an edge projection extending circumferentially continuously or circumferentially in sections, which is formed as toothing and extends on one side or on both sides beyond the respective fastening side of the insert disc.

19. Manufacturing method of a T-shaped fastening insert, in particular a fastening insert according to one of the preceding embodiments 1 to 11, which comprises the following steps:
a. providing (A1) an insert disc of the fastening insert made of plastic, preferably made of transparent plastic or plastic which can be irradiated by light, which comprises two fastening sides arranged opposite one another with a plurality of passage openings arranged off-center about the shaft, which connect the fastening sides to one another and of which at least one passage opening comprises an edge projection extending circumferentially continuously or circumferentially in sections, which is formed as toothing and extends on one side or on both sides beyond the respective fastening side of the insert disc,
b. providing a shaft of the fastening insert (A2),
c. connecting the insert disc and the shaft captively to form a T-shaped fastening insert (A3; A4; A5; A6).

20. Manufacturing method according to embodiment 19, in which the insert disc and the shaft are connected by:
i. mechanical clamping (A3) or latching (A4) of the shaft in a central opening of the insert disc, or
ii. thermal connecting (A5) of the shaft and the insert disc, preferably by ultrasonic welding or friction welding; or
iii. gluing (A6) the shaft and the insert disc.

21. Manufacturing method for a component made of a composite material with a T-shaped fastening insert comprising an insert disc and a shaft fastened thereto, preferably a fastening insert according to one of the embodiments 1 to 8, comprising the following steps:
I. providing (H1) a component mold with at least one first material layer, preferably a first fiber layer, wherein the component mold defines a complementary shape of a component to be manufactured,
II. positioning and pre-fixing the fastening insert on the at least one first material layer, wherein the pre-fixing is achieved by establishing a material-bond and/or positive or form-fit connection between a first fastening side of the insert disc facing the first material layer and the first material layer (H2, H3),
III. after step II, embedding the connection of the fastening insert and the first material layer in a fiber-reinforced plastic or in a foam material (H6).

22. Manufacturing method according to embodiment 21, with the further step:
IV. arranging at least one second material layer, preferably a second fiber layer, on a second fastening layer facing the second material layer in such a manner that the second material layer surrounds the shaft of the fastening insert (H4).

23. Manufacturing method according to embodiment 21,
V. impregnating the stack of the first and the second material layer with the intermediate fastening insert with a liquid resin material and curing to a component of a multi-layer composite material (H6).

24. Manufacturing method according to embodiment 21 or 22 or 23, wherein the pre-fixing is achieved by a positive or form-fit connection by means of a toothing on the first fastening side of the insert disc which engages at least in the first material layer and is interlocked therein (H2).

25. Manufacturing method according to embodiment 21 to 24, wherein the pre-fixing is achieved by means of a material-bond connection by means of a bonding adhesive between the first fastening side of the insert disc and the first material layer, which is cured by means of light and/or heat (H3).

26. Manufacturing method according to embodiment 25, with the further step: applying an adhesive in a concave recess of the first fastening side and curing the adhesive by light irradiation after the positioning on the first material layer, in that the insert disc consisting of a transparent material or a material which can be irradiated by light is irradiated.

27. Manufacturing method according to one of the embodiments 22 to 26 with the further step: fixing the second fastening side of the insert disc at least by means of a positive or form-fit connection to the second material layer in that a toothing on the second fastening side of the insert disc engages at least in the second material layer.

28. Manufacturing method according to one of the embodiments 21 to 24 or 26 to 27 with the further step: stitching the fastening insert to the at least one first material layer.

29. Manufacturing method according to one of the embodiments 21 to 28, wherein the component is manufactured in an RTM method or by cold pressing or by hot pressing.

7. Summary of the Embodiments of the Second Configuration of the Invention

1. Fastening insert made of plastic with a T-shaped configuration consisting of an insert disc and a shaft which is fixedly arranged on the insert disc via a fastening section and projects beyond the insert disc on one side or on both sides with a functional section, of which at least the insert disc can be positioned in a foam material or a composite material during a component manufacturing and can be fastened therein by the component manufacturing, in which the insert disc comprises two fastening sides arranged opposite one another, each forming at least partially an abutment face, and in which:
- a. the shaft comprises a hollow cylindrical shape with a radial outer side and a radial inner side and is connected to the insert disc via the radial outer side, and
- b. a metallic functional structure is non-positively or frictionally anchored to the radial inner side of the hollow cylindrical shaft or is molded positively or in a form-fit manner into the radial inner side of the hollow cylindrical shaft, so that a direct outward contact of the metallic functional structure with the composite material is prevented at least adjacent to the insert disc by the shaft surrounding the functional structure and/or by the insert disc.

2. Fastening insert according to embodiment 1, the shaft of which is formed closed at one end face adjacent to the insert disc and/or the insert disc of which is formed closed in a central portion adjacent to the shaft.

3. Fastening insert according to embodiment 1 or 2, the shaft of which comprises an inner thread on the radial inner side in which a wire thread insert is arranged.

4. Fastening insert according to embodiment 3, in which the inner thread has radially outer thread recesses which comprise a continuous or sectionally circumferential free area in order to blunt the thread recess at least in certain portions.

5. Fastening insert according to embodiment 3 or 4 in which the wire thread insert ends at a distance from an open or closed axial end of the shaft at the fastening section within the shaft.

6. Fastening insert according to one of the embodiments 3 to 5, in which the wire thread insert extends beyond an axial exit of the shaft in the functional section and comprises at least one winding tapered in diameter compared to other windings of the wire thread insert.

7. Fastening insert according to embodiment 1 or 2, in which a metallic thread insert or a metallic connecting insert is glued to the radial inner side of the shaft and/or is connected non-positively or in a force-fit manner to the radial inner side of the shaft, preferably by clamping.

8. Fastening insert according to embodiment 1 or 2, in which a metallic thread insert or a metallic connecting insert or a wound wire thread insert is molded into the radial inner side of the shaft, so that this is held at least positively or in a form-fit manner in the shaft.

9. Fastening insert according to embodiment 7 or 8, in which the thread insert or connecting insert ends at a distance from an axial exit of the shaft at the fastening section within the shaft.

10. Fastening insert according to embodiment 7 or 8 or 9 in which the thread insert comprises a wire thread insert for thread reinforcement.

11. Component consisting of a foam material or a composite material in which a fastening insert according to one of the embodiments 1 to 10 is fixedly arranged within the foam material or the composite material.

12. Connection of at least one first and one second component, of which at least the first component is a component according to embodiment 11, in order to connect the at least one first and one second component to one another by means of a fastening means and the fastening insert in the first component.

13. Manufacturing method of a T-shaped fastening insert, in particular a fastening insert according to one of the preceding embodiments 1 to 10, which comprises the following steps:

- a. providing an injection mold, the mold cavity of which, in complementary form, dictates the structural features of the fastening insert (S1),
- b. filling the mold cavity with at least one flowing plastic (S3, S4),
- c. curing the plastic enclosed in the mold cavity (S5) and
- d. demolding the fastening insert from the injection mold (S6).

14. Manufacturing method according to embodiment 13, which further comprises:
filling the mold cavity with only one plastic, so that the fastening insert is manufactured in a one-component injection molding method (S3) or filling the mold cavity in the portion of the insert disc to be molded with a first plastic and in the portion of the shaft with a second plastic, so that the fastening insert is manufactured in a two-component injection molding method (S4).

15. Manufacturing method according to embodiment 14, second alternative, in which the first and the second plastic are identical and differ with respect to a proportion or amount of reinforcing fibers or in which the first and the second plastic are different in a chemical composition or in which the first and the second plastic are different in a chemical composition and comprise different proportions or amounts of reinforcing fibers.

16. Manufacturing method according to one of the embodiments 13 to 15, in which at least the insert disc is transparent or can be irradiated by light after manufacturing from the first plastic.

17. Manufacturing method according to one of the embodiments 13 to 15, in which the injection mold contains a core, which defines a radial inner wall of a shaft of the fastening insert, so that a thread is formed on the radial inner wall.

18. Manufacturing method according to embodiment 17 with the further step: installing a wire thread insert in the thread of the radial inner wall of the shaft after the demolding (S7).

19. Manufacturing method according to one of the embodiments 13 to 17, with the further step: positioning a wire thread insert or a thread insert or connecting insert in the mold cavity and molding-in of the wire thread insert, thread insert or connecting insert when filling the mold cavity with liquid plastic (S3, S4).

20. Manufacturing method according to one of the embodiments 13 to 17 comprising the further step: installing a thread insert or connecting insert by means of a thermal or mechanical method in the shaft after the fastening insert has been demolded (S8).

21. Manufacturing method of a T-shaped fastening insert, in particular a fastening insert according to one of the preceding embodiments 1 to 10, comprising the following steps:

- a. providing (A1) an insert disc of the fastening insert made of plastic, preferably of transparent plastic or plastic which can be irradiated by light, which has two fastening sides arranged opposite one another with several passage openings arranged off-center about the shaft, which connect the fastening sides to one another and of which at least one passage opening has an edge projection extending circumferentially continuously or circumferentially in sections, which is formed as toothing and extends on one side or on both sides beyond the respective fastening side of the insert disc,
- b. providing a shaft of the fastening insert (A2), c. connecting the insert disc and the shaft captively to form a T-shaped fastening insert (A3; A4; A5; A6).

22. Manufacturing method according to embodiment 21, in which the insert disc and the shaft are connected by:
   i. mechanical clamping (A3) or latching (A4) of the shaft in a central opening of the insert disc, or
   ii. thermal connecting (A5) of the shaft and the insert disc, preferably by ultrasonic welding or friction welding; or
   iii. gluing (A6) the shaft and the insert disc.

23. Manufacturing method according to embodiment 21 or 22, in which a radial inner wall of the shaft of the fastening insert provides a thread, and installing (A7) a wire thread insert in the thread of the radial inner wall of the shaft.

24. Manufacturing method according to embodiment 21 or 23 with the further step: installing a thread insert or a connecting insert by means of a thermal (A8) or a mechanical method (A9) or an adhesive method (A10) in the shaft before or after the insert disc has been connected to the shaft.

25. Manufacturing method according to one of the embodiments 21 to 24, in which the insert disc has two fastening sides arranged opposite one another with several passage openings arranged off-center about the shaft, which connect the fastening sides to one another and of which at least one passage opening comprises an edge projection extending circumferentially continuously or circumferentially in sections, which is formed as toothing and extends on one side or on both sides beyond the respective fastening side of the insert disc.

26. Equipment method for a T-shaped fastening insert, preferably a T-shaped fastening insert according to one of the embodiments 1 to 10, comprising the following steps:
   a. providing a single T-shaped fastening insert or component with a T-shaped fastening insert fastened thereto and
   b1. installing a wire thread insert in a thread on a radial inner wall of a shaft of a T-shaped fastening insert or
   b2. installing a thread insert or a connecting insert by means of a thermal or mechanical method or an adhesive method in a shaft of the T-shaped fastening insert.

27. Manufacturing method for a component made of a composite material with a T-shaped fastening insert, which comprises an insert disc and a shaft fastened thereto, preferably a fastening insert according to one of the embodiments 1 to 10, which comprises the following steps:
   I. providing a component mold with at least one first material layer, preferably a fiber layer, wherein the component mold defines a complementary shape of a component to be manufactured,
   II. positioning and pre-fixing the fastening insert on the at least one first material layer, wherein the pre-fixing is achieved by establishing a material-bond and/or positive or form-fit connection between a first fastening side of the insert disc facing the first material layer and the first material layer,
   III. after step II, embedding the connection of the fastening insert and the first material layer in a plastic, a fiber-reinforced plastic, a resin or in a foam material with or without fiber reinforcement.

28. Manufacturing method according to embodiment 27, with the further step:
   IV. arranging at least one second material layer, preferably a second fiber layer, on a second fastening side of the insert disc facing the second fiber layer in such a manner that the second fiber layer surrounds the shaft of the fastening insert.

29. Manufacturing method according to embodiment 27 or 28,
   V. impregnating the stack of the first and the second material layer with the intermediate fastening insert with a liquid resin material and curing to a component of a multi-layer composite material.

30. Manufacturing method according to embodiment 27 or 28 or 29, wherein the pre-fixing is achieved by a positive connection by means of a toothing on the first fastening side of the insert disc which engages at least in the first layer of material and interlocks therein.

31. Manufacturing method according to one of the embodiments 27 to 30, wherein the pre-fixing is performed by a material-bond connection by means of a connecting adhesive between the first fastening side of the insert disc and the first material layer, which is cured by means of light and/or heat.

32. Manufacturing method according to embodiment 31, with the further step: applying an adhesive in a concave recess of the first fastening side and curing the adhesive by light irradiation after the positioning on the first material layer, in that the insert disc consisting of a transparent material or a material which can be irradiated by light, is irradiated.

33. Manufacturing method according to one of the embodiments 27 to 32 with the further step: fixing the second fastening side of the insert disc at least by means of a positive or form-fit connection to the second material layer, in that a toothing on the second fastening side of the insert disc engages at least in the second material layer.

34. Manufacturing method according to one of the embodiments 27 to 30 and 33 with the further step: stitching the fastening insert to the at least one first material layer.

35. Manufacturing method according to one of the embodiments 27 to 34, wherein the component is manufactured in an RTM method or by cold pressing or by hot pressing.

The invention claimed is:

1. Fastening insert made of plastic with a T-shaped configuration consisting of an insert disc and a shaft which is fixedly arranged on the insert disc via a fastening section and projects beyond the insert disc on one side or on both sides with a functional section, of which at least the insert disc can be positioned in a foam material or a composite material during a component manufacturing and can be fastened therein by the component manufacturing, in which the insert disc comprises two fastening sides arranged opposite one another, each forming at least partially an abutment face, and in which:
   a. the shaft comprises a hollow cylindrical shape with a radial outer side and a radial inner side and is connected to the insert disc via the radial outer side, and
   b. a metallic functional structure is frictionally anchored to the radial inner side of the hollow cylindrical shaft or is molded in a form-fit manner into the radial inner side of the hollow cylindrical shaft, so that a direct outward contact of the metallic functional structure with the composite material is prevented at least adjacent to the insert disc by the shaft surrounding the functional structure and/or by the insert disc, wherein
   c. the shaft is formed closed at one end face adjacent to the insert disc and/or the insert disc is formed closed in a central portion adjacent to the shaft.

2. The fastening insert according to claim 1, the shaft of which comprises an inner thread on the radial inner side in which a wire thread insert is arranged.

3. The fastening insert according to claim 2, in which the inner thread has radially outer thread recesses which comprise a continuous or sectionally circumferential free area in order to blunt the thread recess at least in certain portions.

4. The fastening insert according to claim 3, in which the wire thread insert ends at a distance from an open or closed axial end of the shaft at the fastening section within the shaft.

5. The fastening insert according to claim 3, in which the wire thread insert extends beyond an axial exit of the shaft in the functional section and comprises at least one winding tapered in diameter compared to other windings of the wire thread insert.

6. The fastening insert according to claim 2 in which the wire thread insert ends at a distance from an open or closed axial end of the shaft at the fastening section within the shaft.

7. The fastening insert according to claim 6, in which the wire thread insert extends beyond an axial exit of the shaft in the functional section and comprises at least one winding tapered in diameter compared to other windings of the wire thread insert.

8. The fastening insert according to claim 2, in which the wire thread insert extends beyond an axial exit of the shaft in the functional section and comprises at least one winding tapered in diameter compared to other windings of the wire thread insert.

9. The fastening insert according to claim 1, in which a metallic thread insert or a metallic connecting insert is glued to the radial inner side of the shaft and/or is connected in a force-fit manner to the radial inner side of the shaft, preferably by clamping.

10. The fastening insert according to claim 9, in which the thread insert or connecting insert ends at a distance from an axial exit of the shaft at the fastening section within the shaft.

11. The fastening insert according to claim 10, in which the thread insert comprises a wire thread insert for thread reinforcement.

12. The fastening insert according to claim 9 in which the thread insert comprises a wire thread insert for thread reinforcement.

13. The fastening insert according to claim 9, in which the metallic thread insert or the metallic connecting insert is connected by clamping to the radial inner side of the shaft.

14. The fastening insert according to claim 1, in which a metallic thread insert or a metallic connecting insert or a wound wire thread insert is molded into the radial inner side of the shaft, so that this is held at least in a form-fit manner in the shaft.

15. The fastening insert according to claim 14, in which the thread insert or connecting insert ends at a distance from an axial exit of the shaft at the fastening section within the shaft.

16. The fastening insert according to claim 14, in which the thread insert comprises a wire thread insert for thread reinforcement.

17. A component consisting of a foam material or a composite material in which a fastening insert according to claim 1 is fixedly arranged within the foam material or the composite material.

18. A connection of at least one first and one second component, of which at least the first component is a component according to claim 17, in order to connect the at least one first and one second component to one another by means of a fastening means and the fastening insert in the first component.

19. A method for a T-shaped fastening insert, claim 1, comprising the following steps:
   a. providing a single T-shaped fastening insert or component with a T-shaped fastening insert fastened thereto and
   b1. installing a wire thread insert in a thread on a radial inner wall of a shaft of a T-shaped fastening insert or
   b2. installing a thread insert or a connecting insert by means of a thermal or mechanical method or an adhesive method in a shaft of the T-shaped fastening insert.

* * * * *